US012637171B2

(12) United States Patent
MacMartin et al.

(10) Patent No.: US 12,637,171 B2
(45) Date of Patent: May 26, 2026

(54) STRAIN WAVE GEARS, VEHICLE DRIVE SYSTEMS INCLUDING SAME AND METHODS OF TORQUE AND CADENCE MEASUREMENT

(71) Applicant: FreeFlow Technologies Limited, Glasgow (GB)

(72) Inventors: Neil MacMartin, Glasgow (GB); Neil Edwards, Glasgow (GB)

(73) Assignee: FreeFlow Technologies Limited, Glasgow (GB)

( * ) Notice: Subject to any disclaimer, the term of this patent is extended or adjusted under 35 U.S.C. 154(b) by 1059 days.

(21) Appl. No.: 17/640,075

(22) PCT Filed: Sep. 4, 2020

(86) PCT No.: PCT/GB2020/052121
§ 371 (c)(1),
(2) Date: Mar. 3, 2022

(87) PCT Pub. No.: WO2021/044157
PCT Pub. Date: Mar. 11, 2021

(65) Prior Publication Data
US 2022/0297792 A1     Sep. 22, 2022

(30) Foreign Application Priority Data

Sep. 4, 2019     (GB) .................................... 19123737

(51) Int. Cl.
*B62M 6/50*          (2010.01)
*B62M 6/55*          (2010.01)
(Continued)

(52) U.S. Cl.
CPC ................ *B62M 6/50* (2013.01); *B62M 6/55* (2013.01); *B62M 11/02* (2013.01); *F16H 49/001* (2013.01); *F16H 2049/003* (2013.01)

(58) Field of Classification Search
CPC . B62M 6/40; B62M 6/45; B62M 6/05; B62M 6/55; B62M 6/60; B62M 6/65; F16H 49/001; B62J 45/411
See application file for complete search history.

(56) References Cited

U.S. PATENT DOCUMENTS 9,027,691 B2     5/2015   Ishida et al.
2014/0166384 A1*  6/2014   Ishida ...................... B62M 6/50
                                                          180/206.3
(Continued)

FOREIGN PATENT DOCUMENTS

CN          202201119 U     4/2012
CN          109866866 A     6/2019
(Continued)

OTHER PUBLICATIONS

Translation of EP-2216242-A1 (Year: 2010).*

*Primary Examiner* — Christopher B Wehrly

(57) ABSTRACT

The present disclosure relates to strain wave gears, vehicle drive systems (10) including such gears and methods of torque and cadence measurement. The vehicle drive system (10) comprises a first rotational input, a second rotational input and rotational output (6), wherein the first rotational input is transmitted through a strain wave gear (5) to a first rotational input one-way bearing (34), and wherein the second rotational input is transmitted through a second rotational input one-way bearing (32) to the rotational output (6), the first (32) and second (34) one-way bearings being affixed to a secondary axle (330, 42), the secondary axle (42) driving the rotational output (6), wherein the second rotational input is provided by a primary axle (26), the primary (26) and secondary (42) axles being coaxial, the secondary axle (42) surrounding the primary axle (26), and wherein a strain gauge (84) is provided to measure the torque applied to the primary axle (26). The strain wave gear (5) assembly (Continued)

comprises a strain wave generator (16), an outer ring gear (39) and a flex-spline (38), wherein a distal portion of the flex-spline (38) is coupled to a flex axle, the flex axle (114, 26) being located within the flex-spline (38).

12 Claims, 18 Drawing Sheets

(51) Int. Cl.
   *B62M 11/02*      (2006.01)
   *F16H 49/00*      (2006.01)

(56)             References Cited

U.S. PATENT DOCUMENTS

| 2017/0356816 | A1* | 12/2017 | D'Elia | ................. | G01L 5/0019 |
| 2019/0047659 | A1* | 2/2019 | Usami | ..................... | B62M 6/50 |
| 2020/0063793 | A1* | 2/2020 | Rossberger | ............ | F16C 19/12 |

FOREIGN PATENT DOCUMENTS

| DE | 102016122845 | A1 | | 5/2018 | | |
| EP | 2216242 | A1 | * | 8/2010 | ........... | B62J 45/421 |
| FR | 2724728 | A1 | | 3/1996 | | |

* cited by examiner

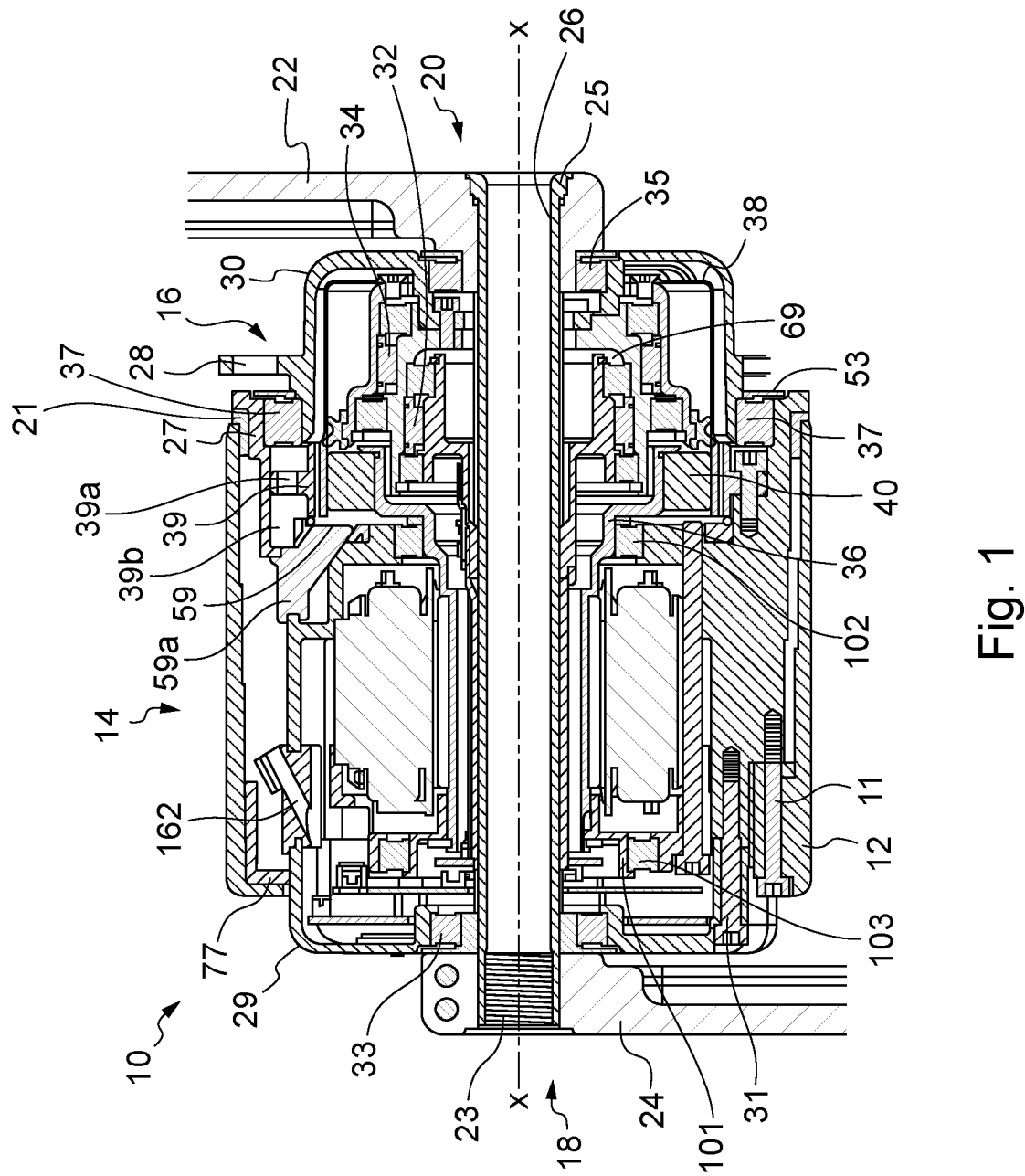
Fig. 1

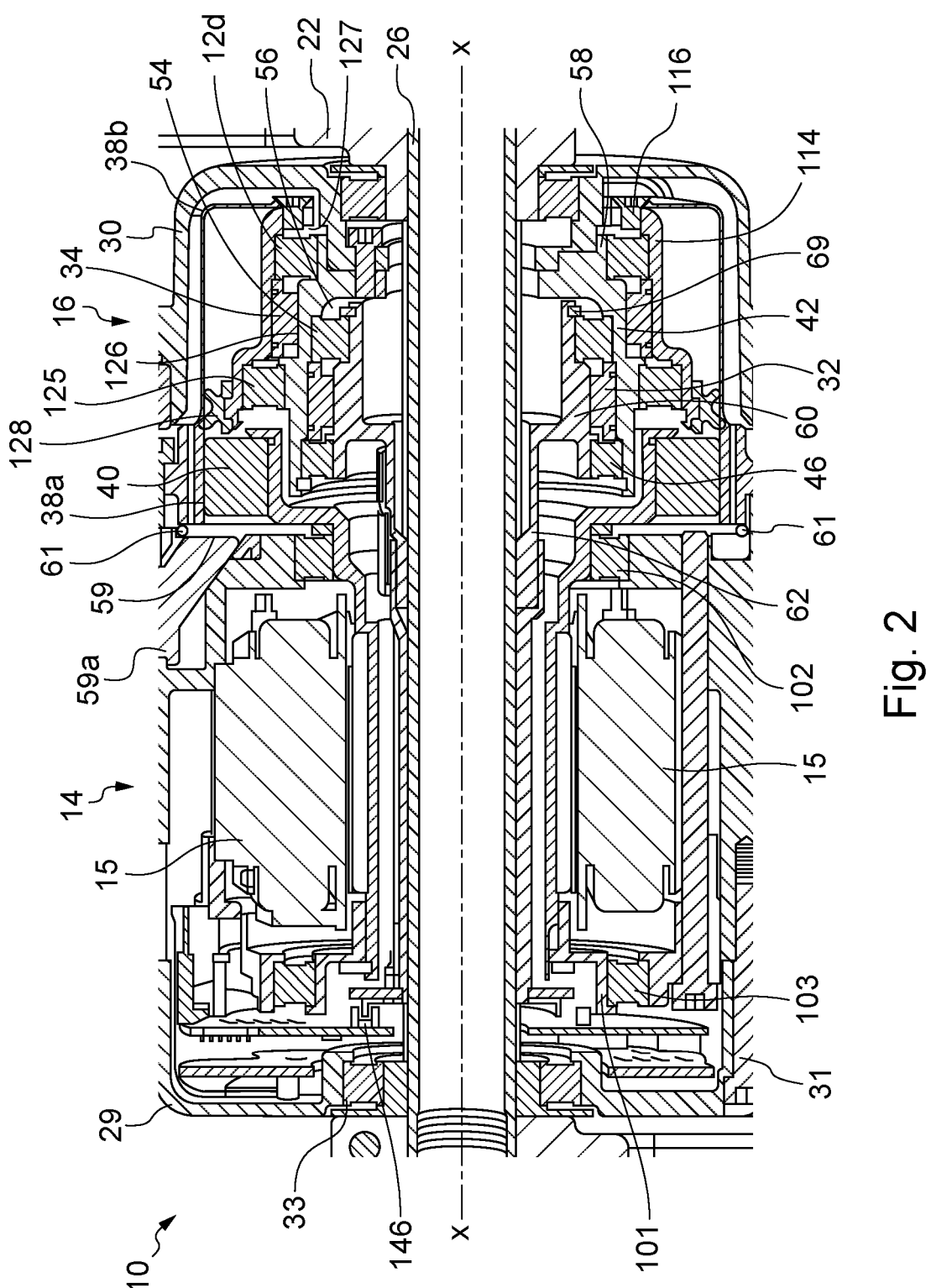
Fig. 2

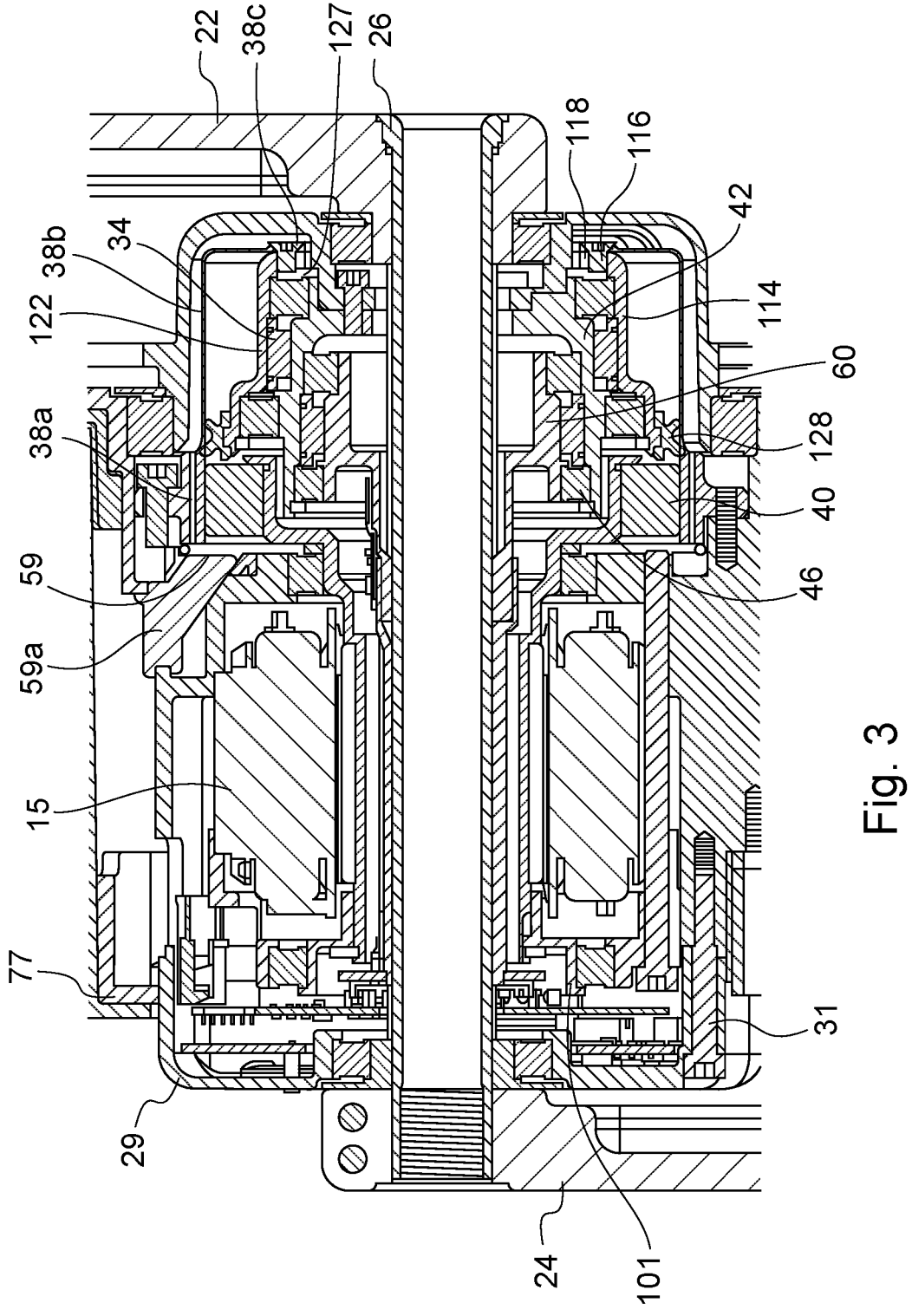
Fig. 3

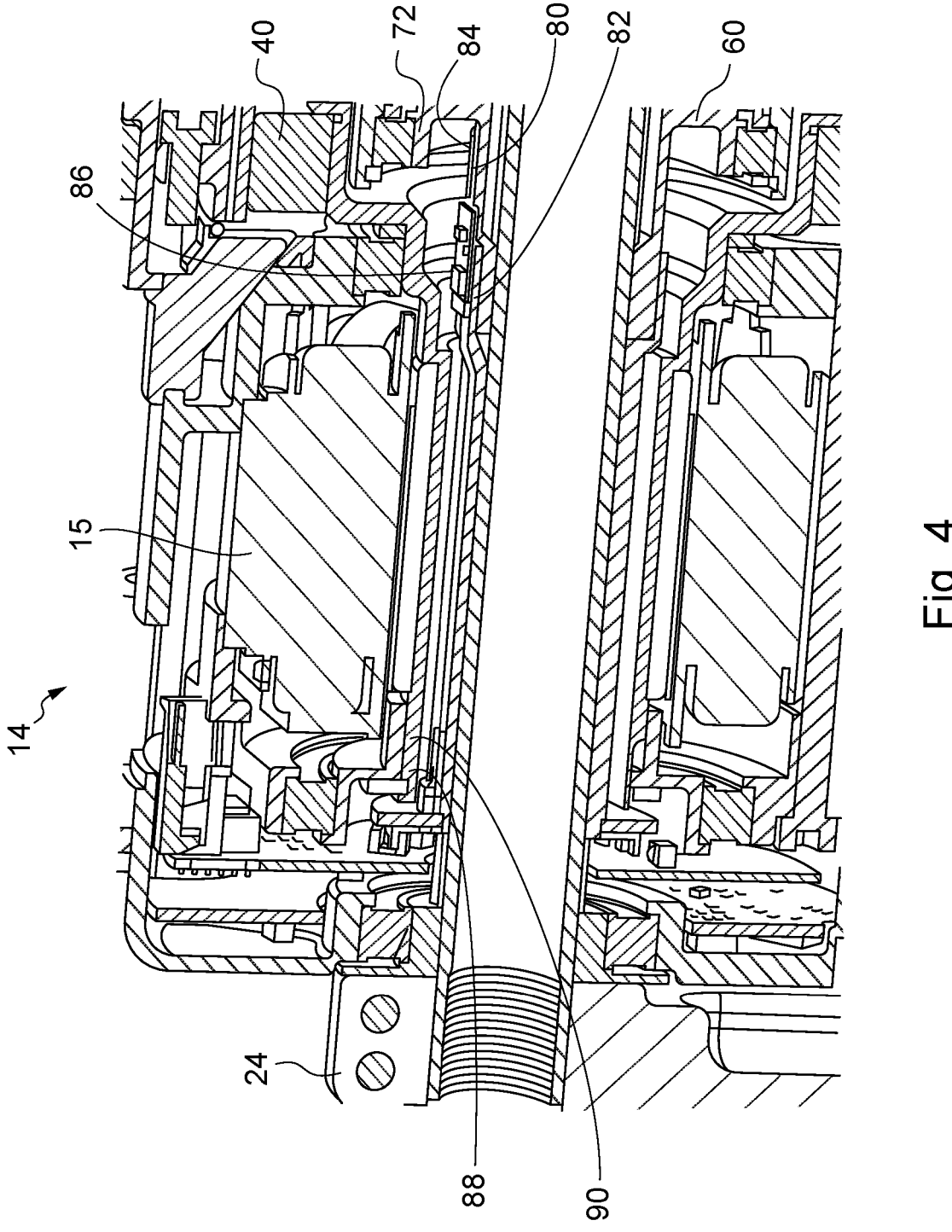
Fig. 4

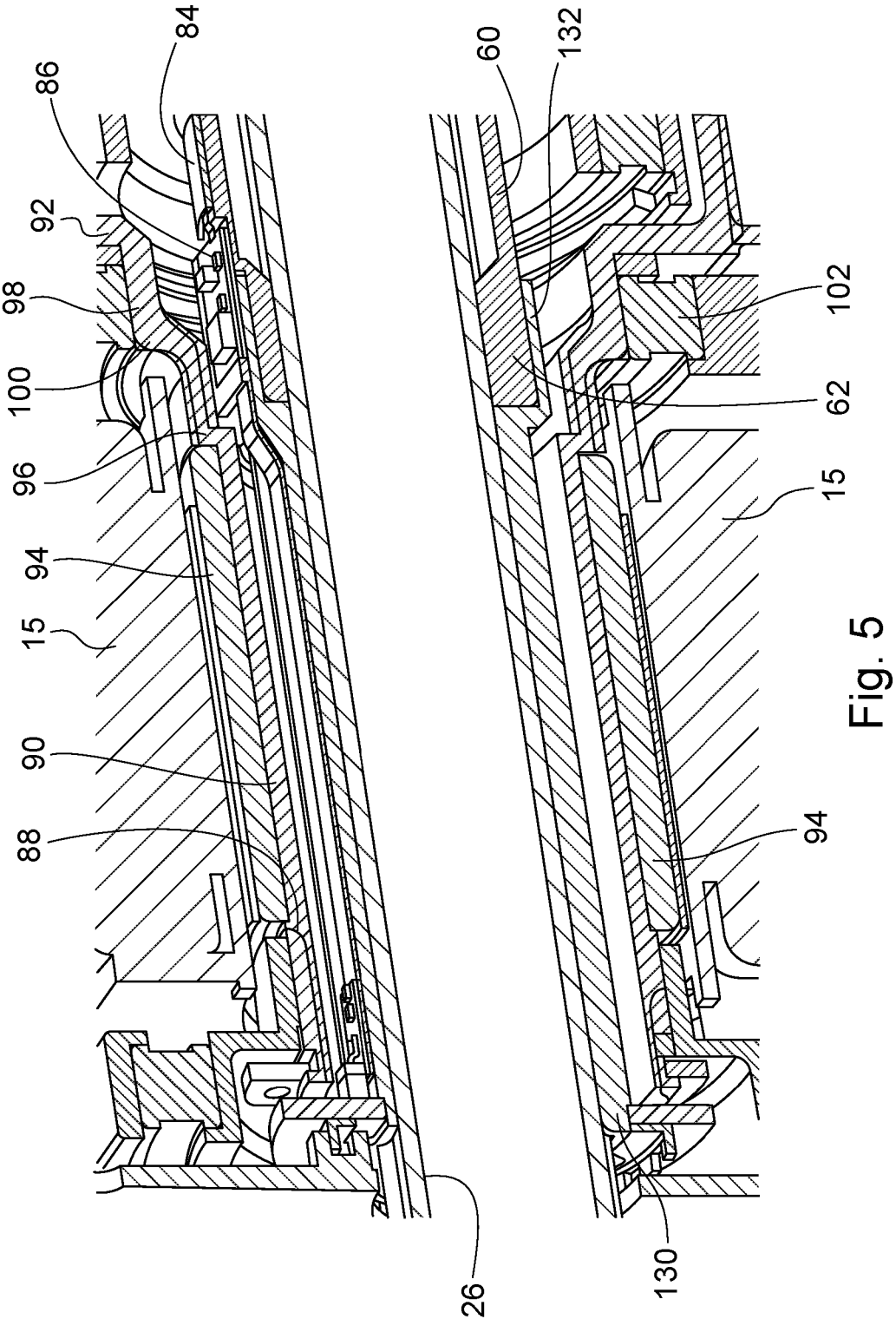
Fig. 5

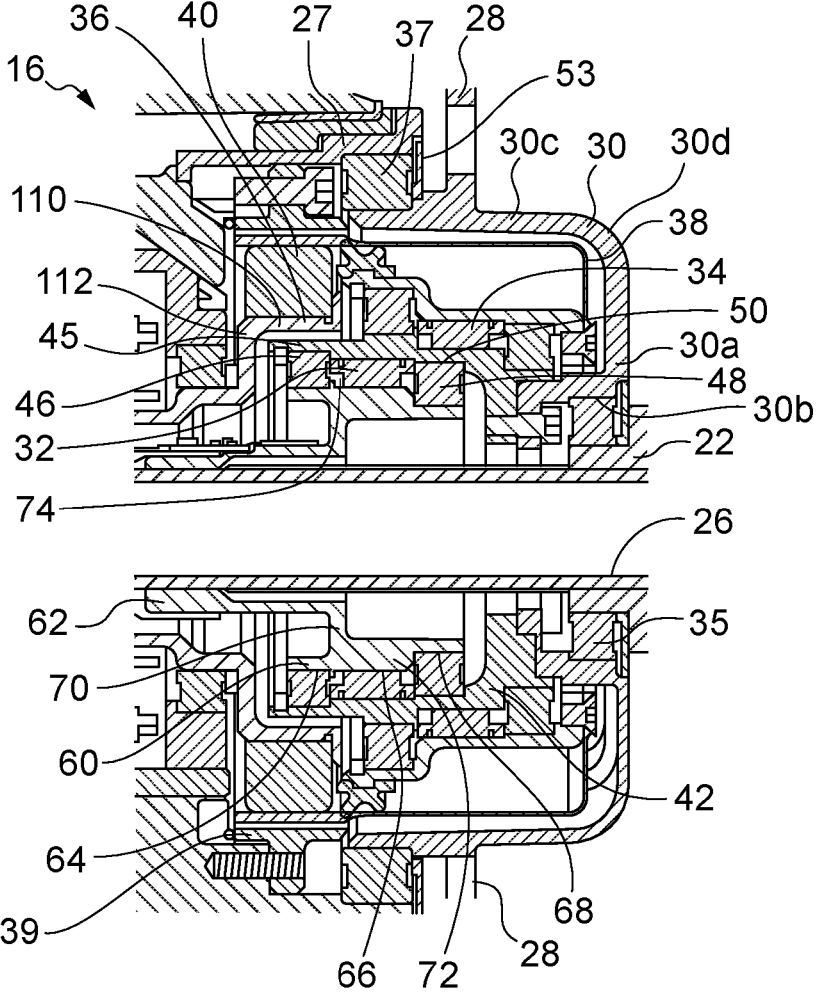
Fig. 6

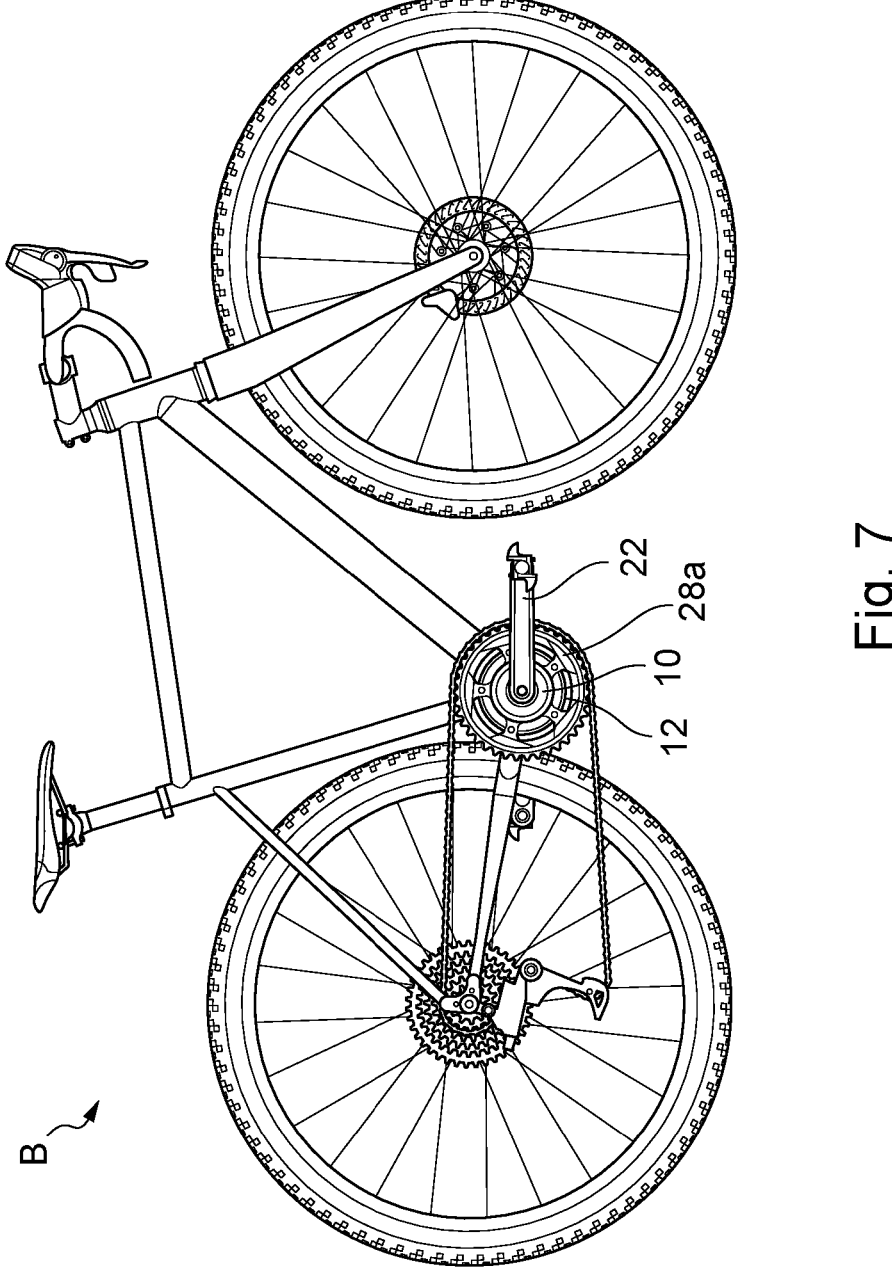
Fig. 7

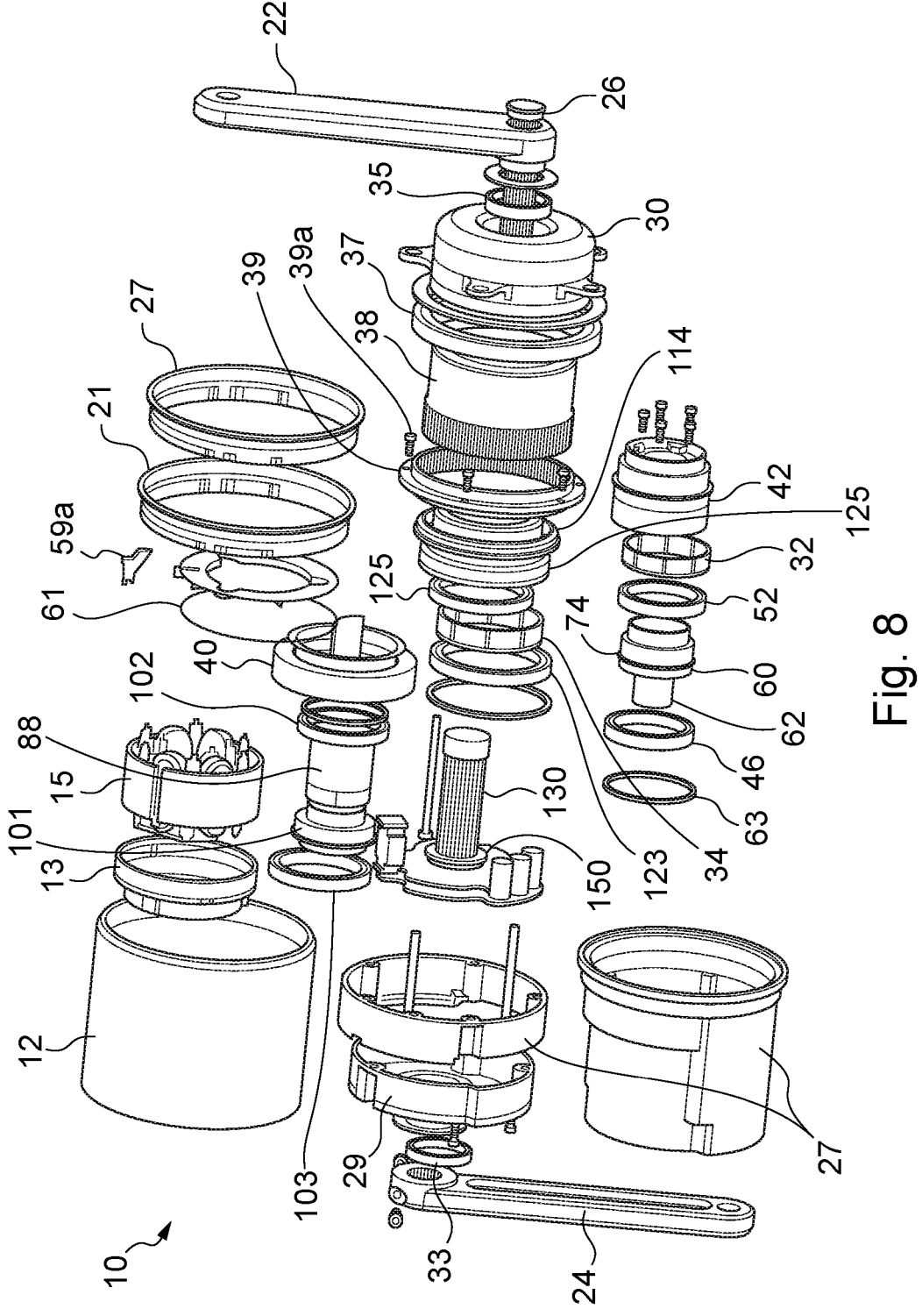
Fig. 8

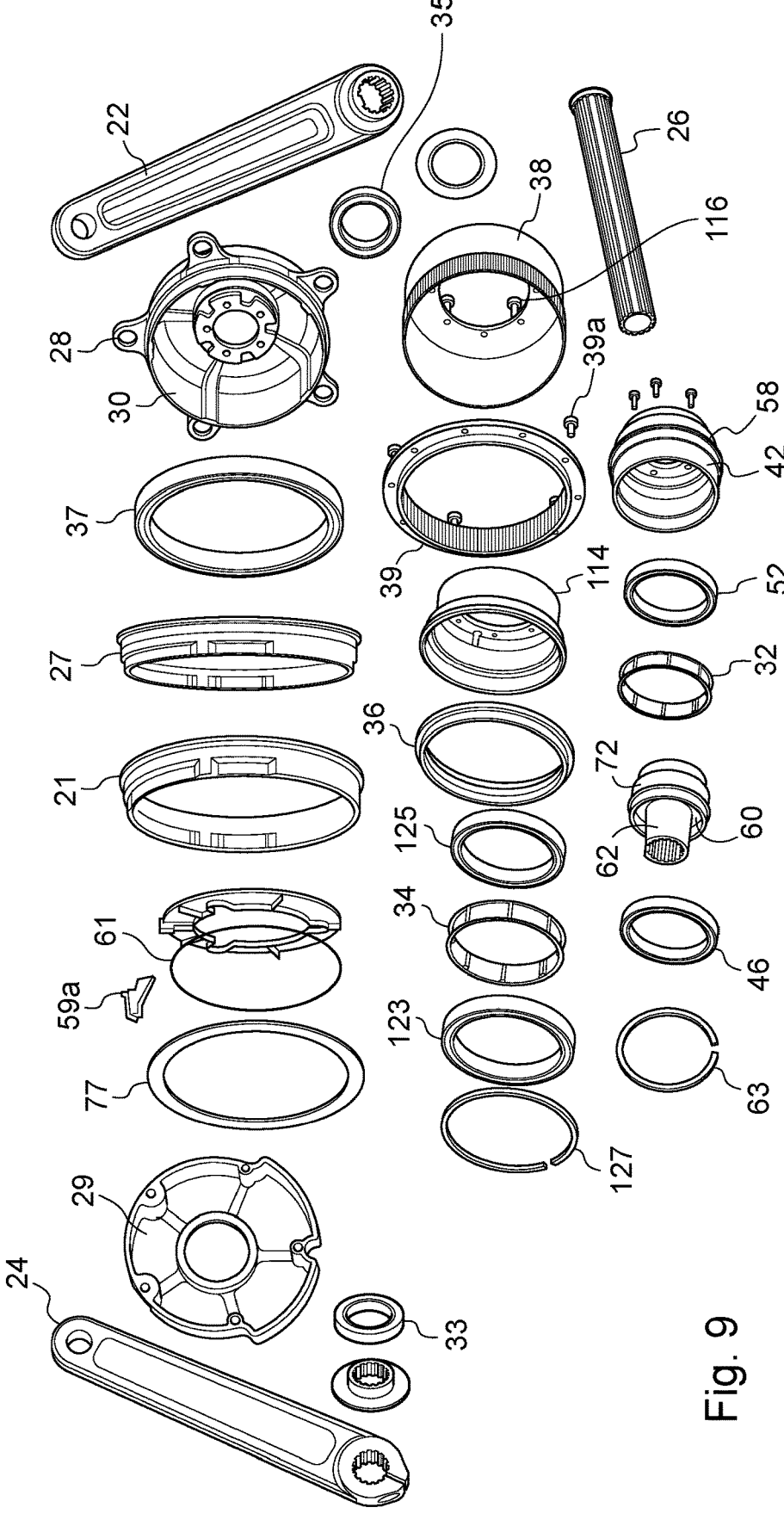
Fig. 9

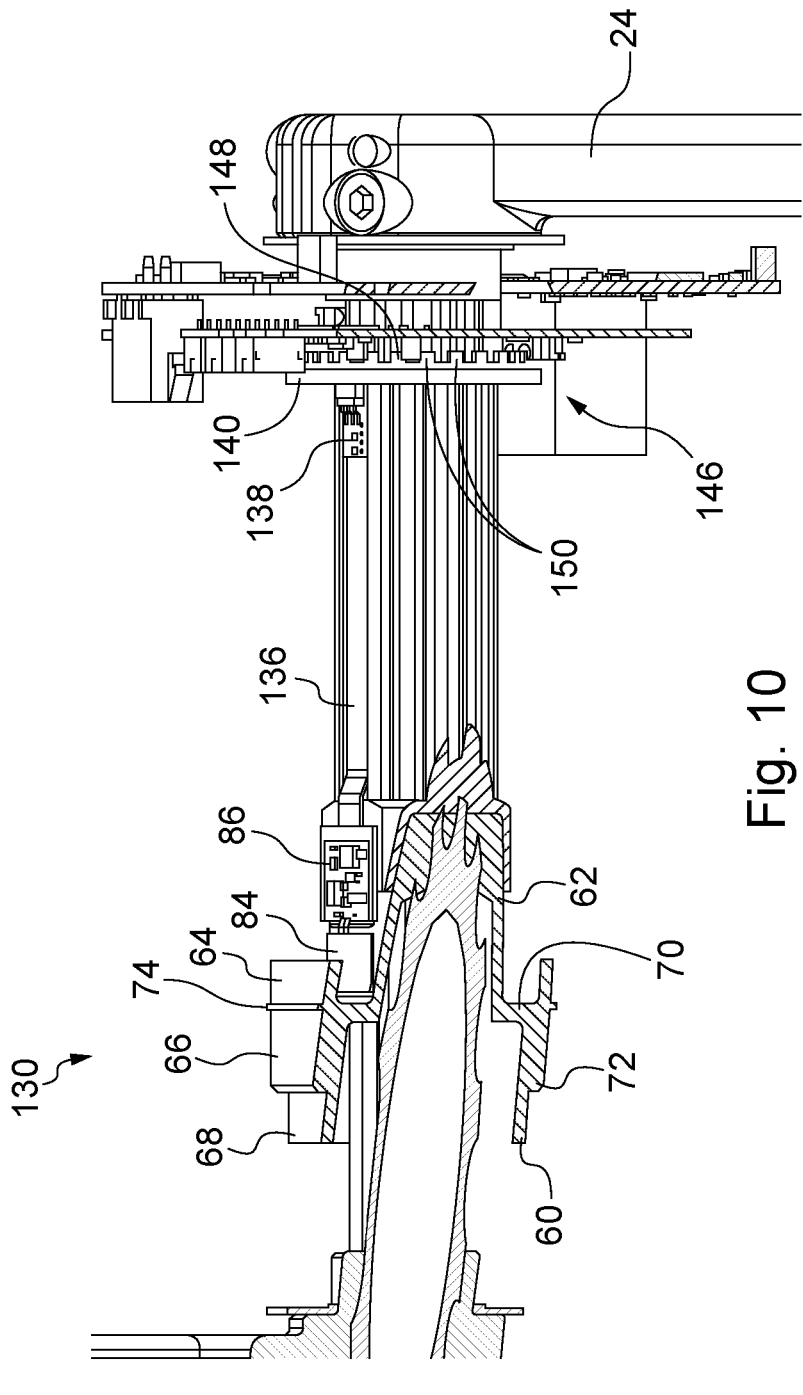
Fig. 10

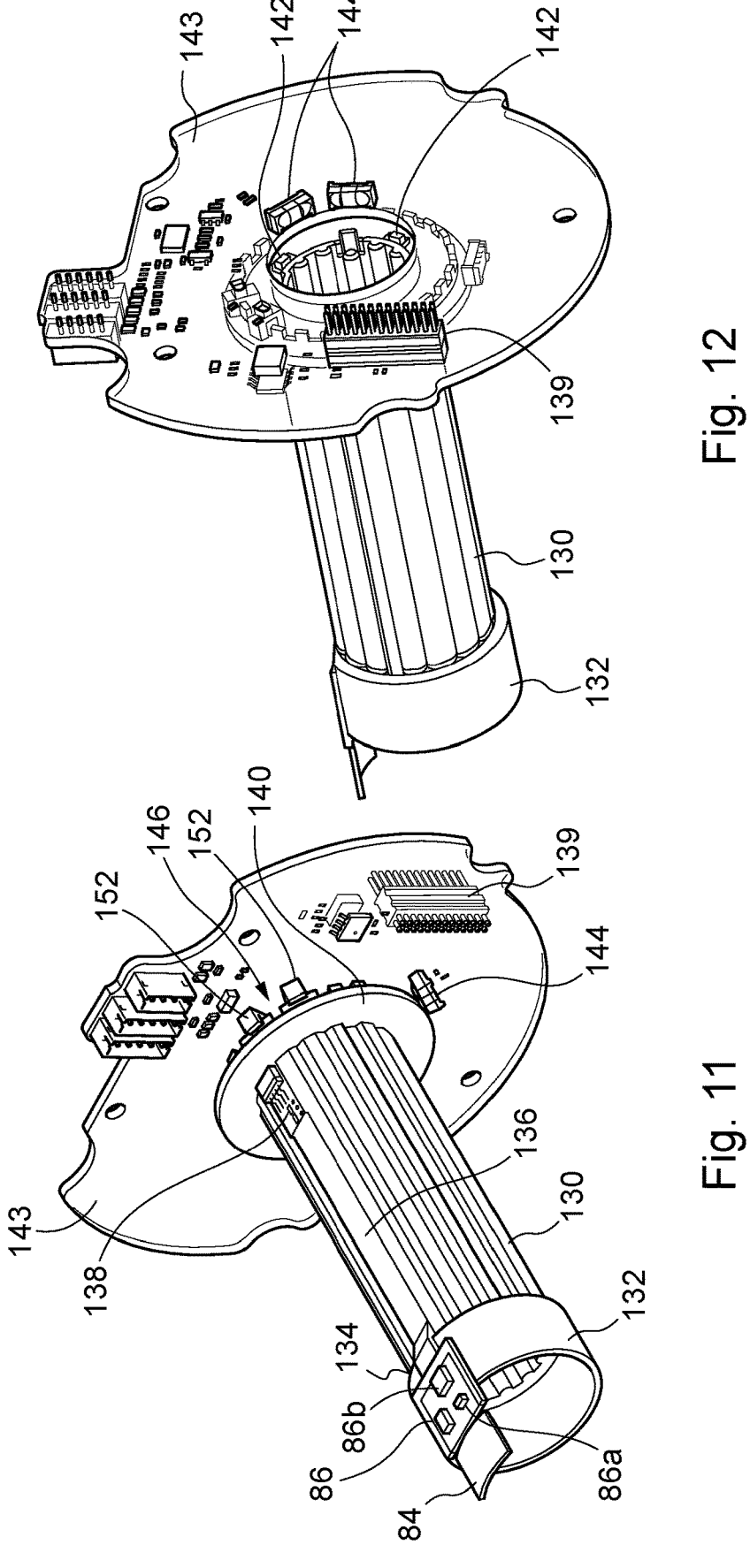
Fig. 12
Fig. 11

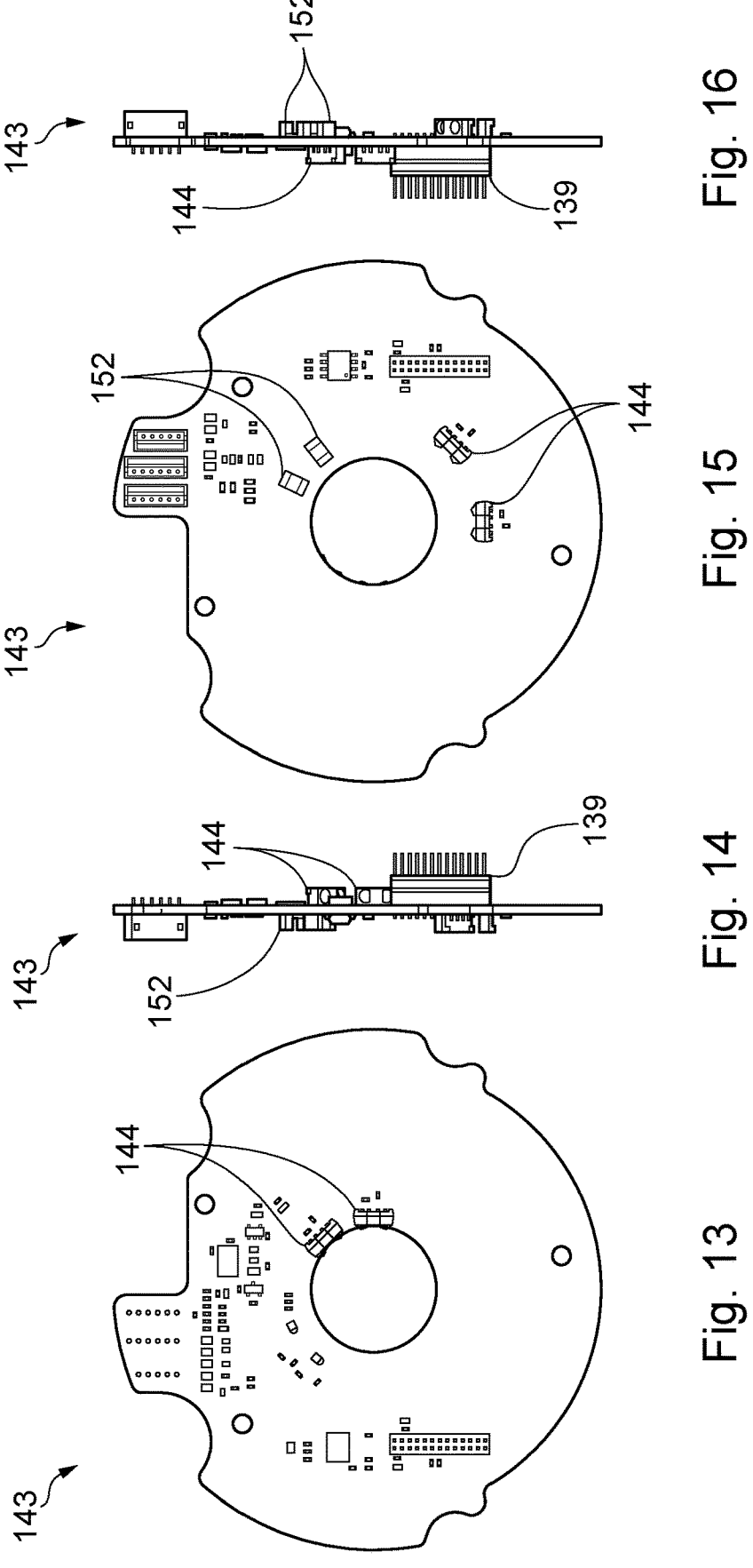
Fig. 16
Fig. 15
Fig. 14
Fig. 13

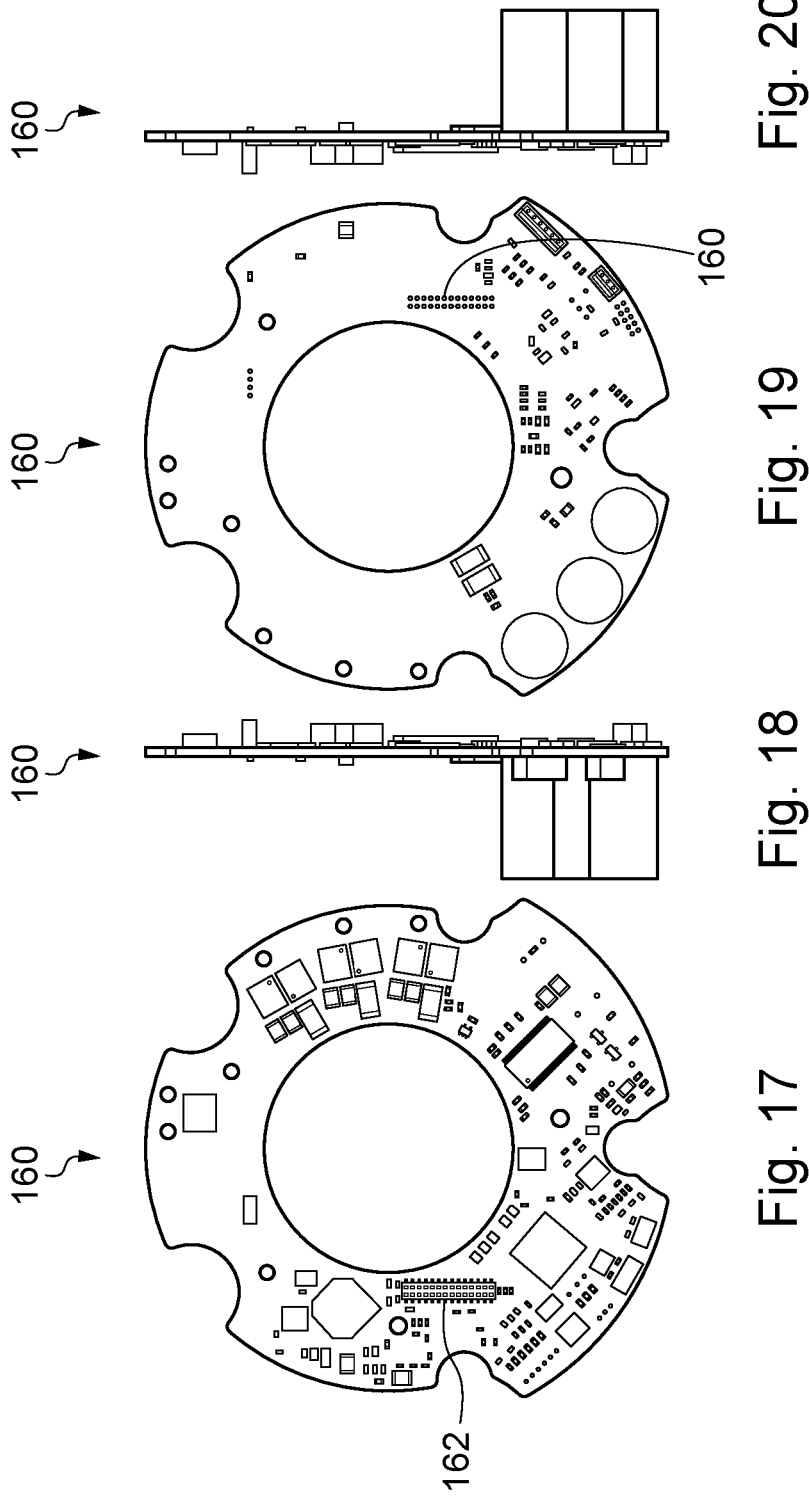
Fig. 20
Fig. 19
Fig. 18
Fig. 17

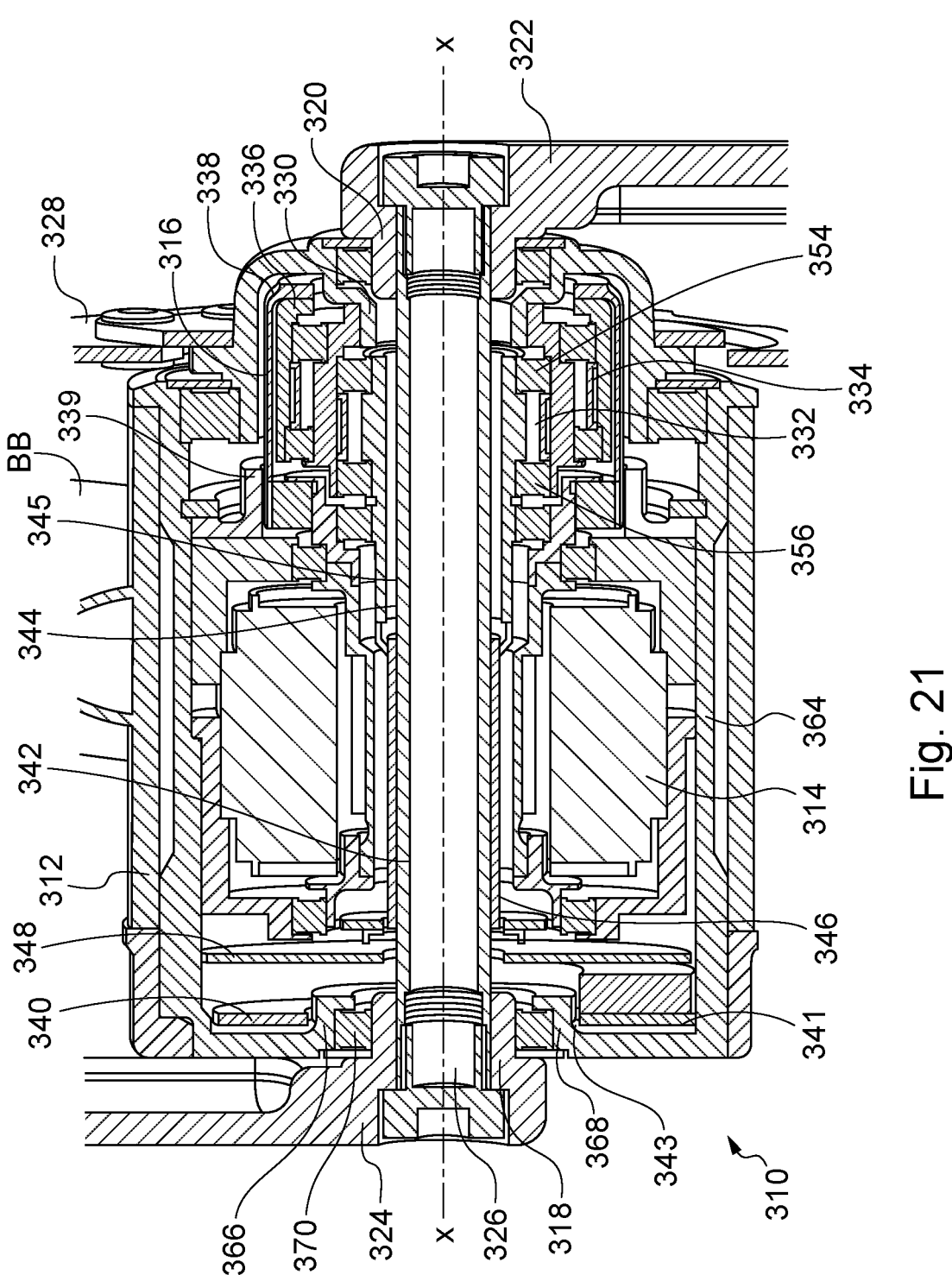
Fig. 21

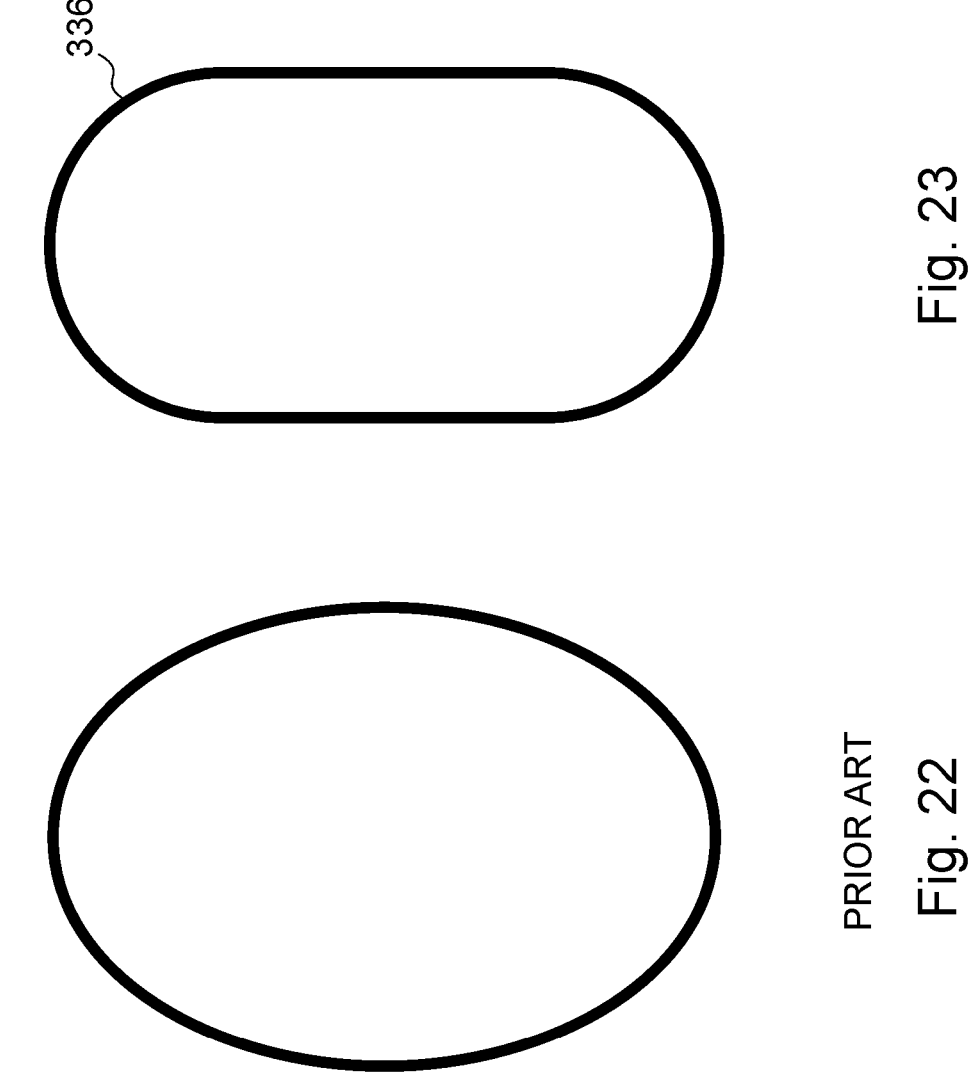
336
Fig. 23
PRIOR ART
Fig. 22

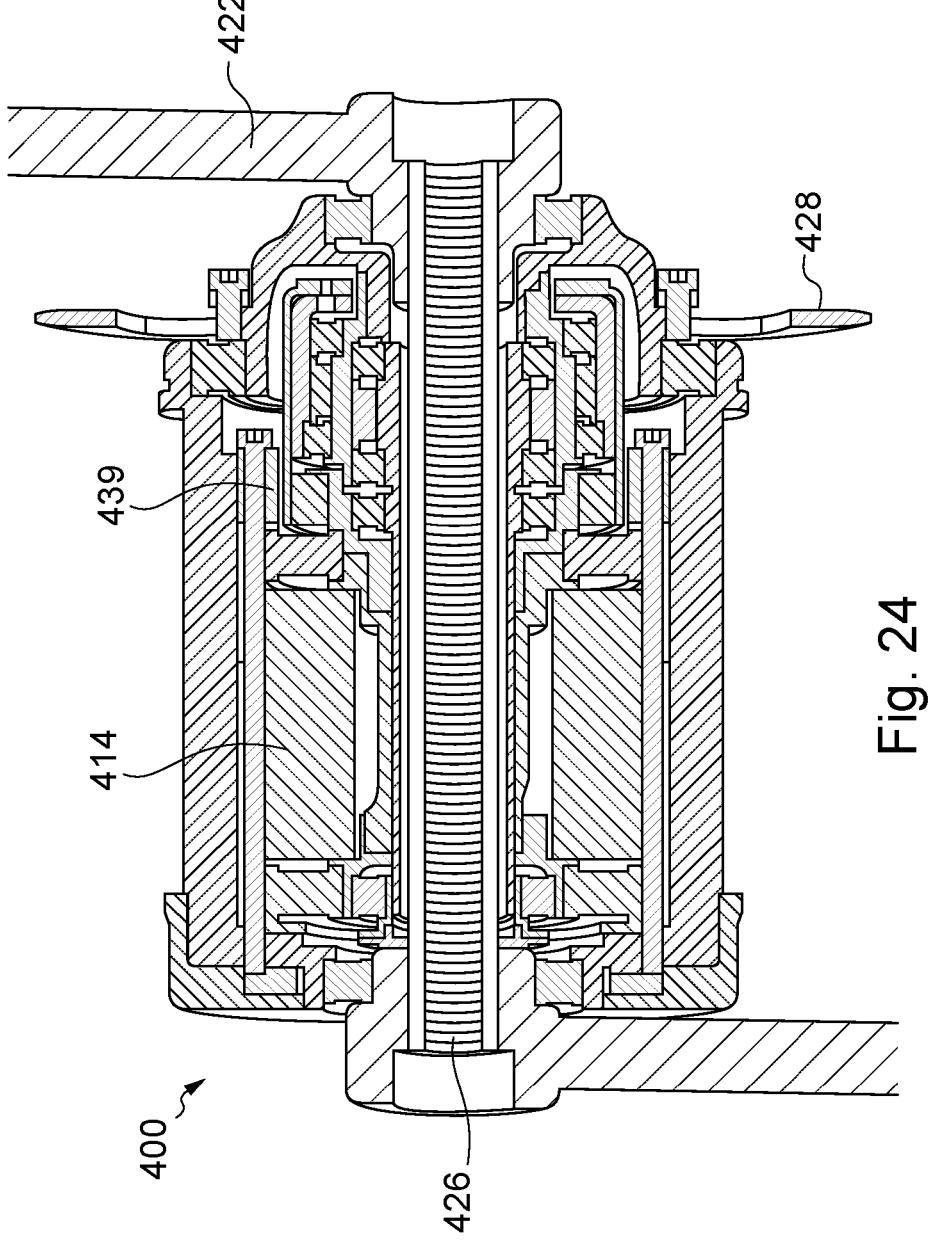
Fig. 24

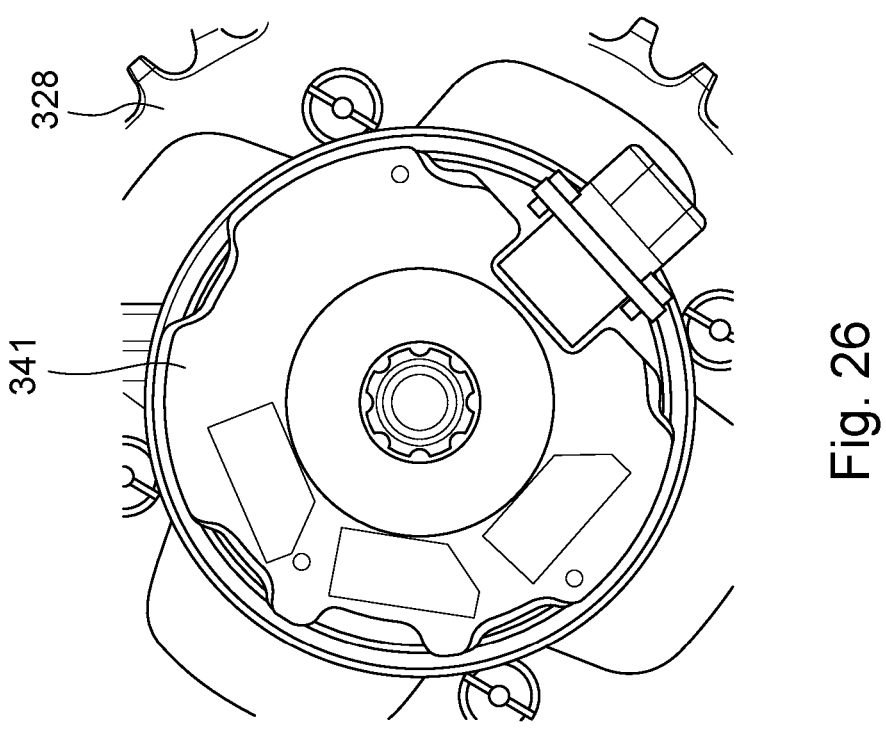
Fig. 26
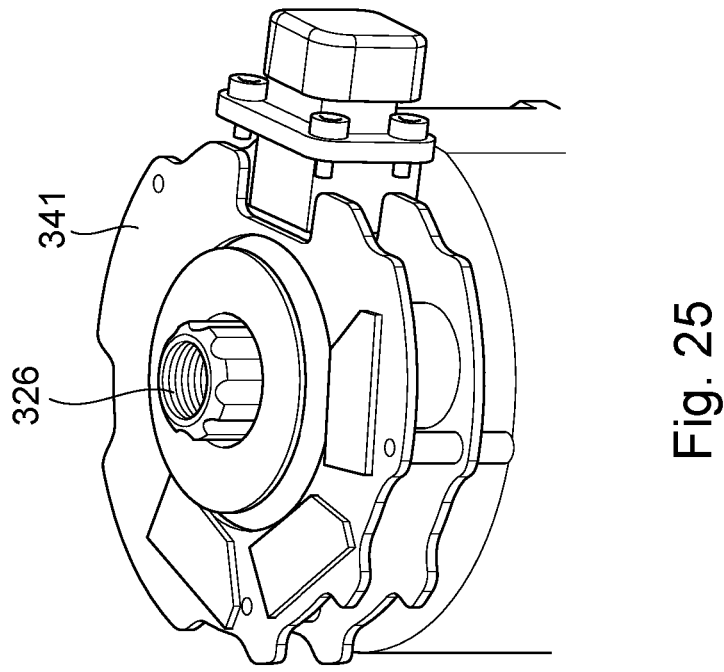
Fig. 25

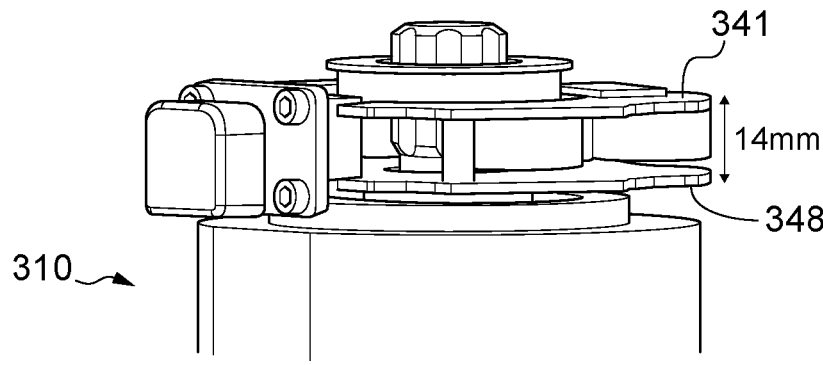
341
14mm
348
310
Fig. 27
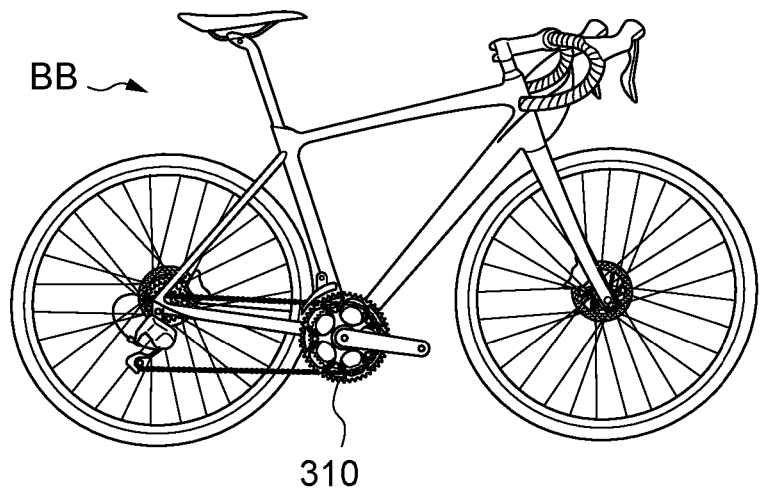
BB
310
Fig. 28

STRAIN WAVE GEARS, VEHICLE DRIVE SYSTEMS INCLUDING SAME AND METHODS OF TORQUE AND CADENCE MEASUREMENT

CROSS-REFERENCE TO RELATED APPLICATION

This application is the National Stage of, and therefore claims the benefit of, International Application No. PCT/GB2020/052121 filed on Sep. 4, 2020, entitled "STRAIN WAVE GEARS, VEHICLE DRIVE SYSTEMS INCLUDING SAME AND METHODS OF TORQUE AND CADENCE MEASUREMENT," which was published in English under International Publication Number WO 2021/044157 on Mar. 11, 2021, and has a priority date of Sep. 4, 2019, based on application GB1912737.2. Both of the above applications are commonly assigned with this National Stage application and are incorporated herein by reference in their entirety.

FIELD OF THE INVENTION

The present invention relates to strain wave gears and the application of those strain wave gears in vehicle drive systems, especially but not limited to electrical bicycle drive systems. The present invention also includes methods of torque and cadence measurement in such applications.

BACKGROUND TO THE INVENTION

Strain wave gears generally comprise a wave generator, a flex-spline and a circular spline ring. They are advantageous for many reasons, including that they are compact and lightweight, allow for high torque, high gear reduction and have virtually no backlash.

Their use in electric bicycle drive systems has been proposed but prior art systems are known to have some drawbacks.

The control of when the electric motor is activated can be difficult, especially if it is desirous that such control be automatic and dependent on such factors as the bicycle's velocity and the rider's effort.

SUMMARY OF THE INVENTION

According to a first aspect of the present invention there is provided a vehicle drive system comprising a first rotational input, a second rotational input and rotational output, wherein the first rotational input is transmitted through a strain wave gear to a first rotational input one-way bearing, and wherein the second rotational input is transmitted through a second rotational input one-way bearing to the rotational output, the first and second one-way bearings being affixed to a secondary axle, the secondary axle driving the rotational output, wherein the second rotational input is provided by a primary axle, the primary and secondary axles being coaxial, the secondary axle surrounding the primary axle, and wherein a strain gauge is provided to measure the torque applied to the primary axle.

A signal supplied by the strain gauge may provide an input to a control signal for the first rotational input.

The strain gauge may be mounted on or around the primary axle.

There may be a tertiary axle surrounding and rotationally coupled to the primary axle and the strain gauge may be mounted upon the tertiary axle.

The strain gauge may be coupled to an analogue to digital convertor.

The analogue to digital convertor may supply a digital control signal to one or more LED emitters.

There may be one or more LED sensors co-operable with the one or more LED emitters.

There may be a cadence sensor for the second rotational input.

The cadence sensor may comprise a toothed light gate disk rotationally coupled to the primary axle with one or more LED sensor and emitters being provided co-operable with the toothed light gate disk.

There may be two pairs of U-shaped LED sensors and emitters and wherein the toothed light gate disk is situated at least partially within the U-shaped LED sensors and emitters.

A torque measurement signal provided by the torque measuring LED sensors may be combined with a cadence measurement signal to provide a control signal for the first rotational input.

The first rotational input may be an electric motor.

The second rotational input may be a pedal crank system.

The first and second one-way bearings on the secondary axle may be both flanked on either side by support bearings.

One or more circlips may be provided to abut one or more of the support bearings.

According to a second aspect of the present invention there is provided a strain wave gear assembly comprising a strain wave generator, an outer ring gear and a flex-spline, wherein a distal portion of the flex-spline is coupled to a flex axle, the flex axle being located within the flex-spline.

The flex axle may be hollow and one or more bearings may be mounted within the flex axle.

At least one of the bearings may be a one-way clutch bearing.

There may be provided a secondary drive axle located within the flex axle and an inner race of the one-way clutch bearing may be connected to the outer surface of the secondary drive axle.

The one-way clutch bearing may be flanked by two bearings.

The two bearings may be simple ball bearings or may be thrust bearings.

According to a third aspect of the present invention there is provided a method of measuring torque in a vehicle drive system comprising the steps of: using a strain gauge to measure the torsion on an axle and produce a variable resistance; converting the variable resistance to a digital signal; using a light signal to transmit a measurement of the applied torque.

According to a fourth aspect of the present invention there is provided a method of measuring the cadence of an axle within a vehicle drive system comprising the steps of: providing a toothed light gate disk coupled to said axle; providing at least two LED emitter/sensor assemblies co-operable with said light gate disk; generating a signal from each of the two LED emitter/sensor assemblies; comparing the signals to ascertain cadence of the axle.

According to a fifth aspect of the present invention there is provided a bicycle including a drive system according to the first aspect.

According to a sixth aspect there is provided a bicycle including a strain wave gear assembly according to the second aspect.

According to a seventh aspect of the present invention there is provided a strain wave gear comprising a wave generator, a flex-spline and a circular spline, wherein the wave generator is a non-elliptical shape.

The wave generator may be a generally rounded rectangular shape.

The longer side of the rounder rectangular shape may be somewhat curved.

The wave generator may be a generally non-regular elliptical shape.

The use of such a shape increases the number of teeth of the wave generator which are meshed with those of the flex-spline. This may increase the possibility/extent of backlash, but may increase the efficiency of the drive, by preventing the need for the wave generator to be sized to cause an elastic deformation of the flex-spline upon insertion, reducing the load on the bearing(s) and reducing the start-up torque required.

According to an eighth aspect of the present there is provided a vehicle drive system including a strain wave gear of the seventh aspect.

The drive system may include alternative strain wave gears.

The drive system may generally comprise a first rotational input, a second rotational input and a rotational output.

The first rotational input may be a manually driven axle. This may include a pedal-crank driven bicycle axle.

The second rotational input may be a motor driven input. This may include an electric motor. The electric motor may drive the strain wave gear.

The rotational output may be a gear. It may be a chain-ring gear. The chain ring gear may drive a chain and onto a rear-wheel cog.

The drive system may include a manual input torque sensor.

The torque sensor may comprise a resilient connector provided on a manual drive axle connected to a light gate disk. There may be provided additional connections between the resilient connector and the light gate disk. This may be a boss or axle or similar device.

Light sensors may be placed adjacent the disk to enable measurement of the rotation of the disk via one or more apertures provided on the disk.

There may be any number of apertures on the disk, the more apertures resulting in greater accuracy.

There may be at least one aperture.

There may be generally be from 20 to 360 apertures.

There may be generally be from 20 to 120 apertures.

There may be provided two light sensor arrays.

These may be provided adjacent opposite sides of the disk. For example, a first at top dead centre and a second at bottom dead centre (as considered from the perspective of gravity and level orientation of a bicycle equipped with such a drive system).

One light sensor array may be configured to provide a measurement of the speed of rotation of the disk by measurement of the apertures rotating by sensing the increase in light; the number of apertures and their circumferential difference being known constants.

One light sensor may be configured to measure the relative transparency or opacity of the section of disk within its sensing area. For example, if 50% of the area of the aperture is within the sensing area, around 50% of the light may be measurable and the motor controller may infer/calculate that condition accordingly.

The speed, rotation and applied torque may be inferred and used as a control input into the motor controller.

The torque sensor may alternatively be provided by a ferromagnetic flux sensor.

The rotational output may be connected to the first rotational input by way of a first rotational input one-way bearing.

The rotational output may be connected to the second rotational output by way of a second rotational input one-way bearing.

One or more support bearings may be provided to flank and abut the first rotational input one-way bearings to mitigate axial travel of the first rotational input one-way bearing.

One or more circlips may be provided to axially locate the first rotational input one-way bearing.

One or more support bearings may be provided to flank and abut the second rotational input one-way bearings to mitigate axial travel of the second rotational input one-way bearing.

One or more circlips may be provided to axially locate the second rotational input one-way bearing.

The strain wave gear comprises a wave generator, a flex-spline and a circular spline. An electric motor may drive the flex-spline, with the wave generator being attached to the rotational output.

The flex-spline may define a locus of space and within that locus one or more of the one-way bearings may be located.

The drive system may be located within a case. The case may be attachable within a bottom bracket shell of a bicycle.

The drive system may additionally include a motor controller board.

The motor controller board may be generally disk-shaped with a central axle aperture. The plane of the disk may be orientated generally perpendicular to a central rotational axis of the drive system.

The motor controller board may be mounted on a controller board boss. The controller board boss may be adjacent one of the pedal cranks. The boss may be formed around a pedal crank bearing housing.

The components of the drive system may be axially located between the pedal cranks. They may be ordered: (1) offside pedal crank (2) motor control board (3) electrical motor (4) strain wave gear (5) rotational output (6) nearside pedal crank.

According to a ninth aspect of the present invention there is provided a torque sensor for an electric bicycle drive system comprising a resilient connector connectable to a manual drive axle of the drive system connected to a light gate disk.

There may be provided additional connections between the resilient connector and the light gate disk. This may be a boss or axle or similar device.

Light sensors may be placed adjacent the disk to enable measurement of the rotation of the disk via one or more apertures provided on the disk.

There may be any number of apertures on the disk, the more apertures resulting in greater accuracy.

There may be at least one aperture.

There may be generally be from 20 to 360 apertures.

There may be generally be from 20 to 120 apertures.

There may be provided two light sensor arrays.

These may be provided adjacent opposite sides of the disk. For example, a first at top dead centre and a second at bottom dead centre (as considered from the perspective of gravity and level orientation of a bicycle equipped with such a drive system).

One light sensor array may be configured to provide a measurement of the speed of rotation of the disk by measurement of the apertures rotating by sensing the increase in light; the number of apertures and their circumferential difference being known constants.

One light sensor may be configured to measure the relative transparency or opacity of the section of disk within its sensing area. For example, if 50% of the area of the aperture is within the sensing area, around 50% of the light may be measurable and the motor controller may infer/ calculate that fact accordingly.

The speed, rotation and applied torque may be inferred and used as a control input into the motor controller.

BRIEF DESCRIPTION OF THE DRAWINGS

Embodiments of the present invention will now be described, by way of example only, with reference to the following drawings, in which:

FIG. 1 is a cross-sectional side elevation of a first embodiment bicycle drive system and strain wave gear according to the present invention;

FIG. 2 is a further cross-sectional side elevation of the apparatus of FIG. 1;

FIG. 3 is a cross-sectional view of a second embodiment bicycle drive system and strain wave gear according to the present invention;

FIG. 4 is a perspective detail cross-sectional view of the electric motor of the apparatus of FIG. 1;

FIG. 5 is a perspective detail cross-sectional view of the apparatus of FIG. 1,

FIG. 6 is a cross-sectional side elevation of the strain wave gear of FIG. 3;

FIG. 7 is a side elevation of a bicycle fitted with the drive system of FIG. 1;

FIG. 8 is an exploded perspective view of the various components of the drive system of FIG. 1;

FIG. 9 is a further exploded perspective view of some of the various components of the drive system of FIG. 1;

FIG. 10 is a side part-sectional elevation of the electronics mounting axle assembly of the apparatus of FIG. 1.

FIG. 11 is a perspective view of the electronics mounting axle assembly of FIG. 10;

FIG. 12 is a further perspective view of the electronics mounting axle assembly of FIG. 10;

FIG. 13 is a plan view of the communications board of the apparatus of FIG. 1;

FIG. 14 is a side elevation of the communications board of FIG. 13;

FIG. 15 is a further plan view of the communications board of FIG. 13;

FIG. 16 is a further side elevation of the communications board of FIG. 13;

FIG. 17 is a plan view of the power board of the apparatus of FIG. 1;

FIG. 18 is a side elevation of the power board of FIG. 17;

FIG. 19 is a further plan view of the power board of FIG. 17;

FIG. 20 is a further side elevation of the power board of FIG. 17;

FIG. 21 is a cross-sectional side elevation of a third embodiment bicycle drive system according to the present invention;

FIG. 22 is a diagrammatic representation of the outer shape of a prior art wave generator;

FIG. 23 is a diagrammatic representation of the outer shape of the wave generator of FIG. 21;

FIG. 24 is a cross-sectional side elevation of a fourth embodiment drive system according to the second aspect of the present invention including a strain wave gear according to the first aspect of the present invention;

FIG. 25 is a perspective view of the motor controller board of the drive system of FIG. 21;

FIG. 26 is a side elevation of the drive system of FIG. 21 showing detail of the motor controller board;

FIG. 27 is a further perspective view of the motor controller board side of the drive system of FIG. 21; and FIG. 28 is a side elevation of a bicycle including the third or fourth embodiment drive system.

Referring to the drawings and initially to FIG. 1, an electric bicycle drive system 10 is shown. The drive system 10 is located within the bottom bracket shell 12 of a bicycle B. The drive system 10 comprises an electric motor 14, a strain wave gear 16 and a first or manual rotational input 18 (namely a pedal-crank system 20). The electric motor 14 acting through the strain wave gear 16 provides a second or electrical rotational input. The drive system 10 has a major axis X-X around which some of the various components rotate as will be described further below. The electric motor 14 and pedal crank system 20 provide a first and second rotational input to the system. Bolts 11 secure the drive system 10 to the bottom bracket shell 12.

Two slightly different embodiments are depicted: the first in FIGS. 1, 2, 4 & 5 and the second in FIGS. 3 & 6. The two embodiments differ in only one feature—a circlip—as will be described subsequently. Given this minor difference the two embodiments will be described concurrently.

The pedal-crank system 20 comprises two pedal cranks 22, 24, connected by a crank axle 26. A pedal crank bolt 23 attaches the motor side crank 24. A splined connector 25 is provided on the strain wave gear side of the crank axle 26 to attach the drive side crank 24 to the axle 26. The crank axle 26 is splined.

The electric motor 14 includes a stator coil 15 which surrounds the crank axle 26. A motor retaining bracket 13 is used to mount the stator coil within the drive 10.

A housing or case 27 is provided into which the various components are mounted. The housing or case 27 is substantially cylindrical and may be mounted with the bottom bracket shell 12 of bicycle B. A motor side end cap 29 is attached to the case 27 by bolts 31. A motor side crank bearing 33 is provided within the motor side end cap 29 to enable the motor side crank 24 and crank axle 26 to rotate within the motor side end cap 29. The motor side crank bearing 33 is a two-way ball bearing. A motor side rubber gasket 77 is provided between the bottom bracket shell 12 and the motor side end cap 29. The case 27 comprises a central cylindrical element to which first and second end rings are mounted.

Chain ring attachment lugs 28 are provided on a drive cap 30, with both the electric motor 14 (via the strain wave gear 16) and the pedal-crank system 20 imparting rotational motion to the drive cap 30. A gear side crank bearing 35 is provided within the drive cap 30 to enable the gear side crank 22 and crank axle 26 to rotate within the drive cap 30. The drive cap 30 is a cup-shaped component with an end face 30*a* which houses the gear side crank bearing 35. A bearing socket 30*b* is provided within the end face 30*a*. The chain ring lugs 28 extends from the side wall 30*c* of the drive cap 30. A filleted transition 30*d* is provided between the side wall 30*c* and the end face 30*a*.

A drive cap bearing 37 is provided between the drive cap 30 and the case 27, enabling the drive cap 30 to freely rotate within the case 27 and the bottom bracket shell 12. A drive side rubber gasket 21 is located between the case 27 and the bottom bracket shell 12. The gasket 21 helps mitigate material ingress and provides some resilient mounting for the drive system 10. A splash guard disk 53 is mounted on the case 27 and covers the drive cap bearing 37. The splash guard disk 53 mitigates water ingress to the drive system 10 from the environment.

A crank one-way bearing 32 and motor one-way bearing 34 are provided, respectively, between the pedal-crank system 20 and the strain wave gear 16, meaning that rotational inputs from each source are insulated from one another and the rider does not feel any motion from the electric motor 14, nor can the rider damage the motor 14 or strain wave gear 16 through the action of their pedalling. The one-way bearings are sprag clutches in the present embodiment, but alternatives are possible.

The strain wave gear 16 of the present embodiment comprises a wave generator 36, a flex-spline 38 and an outer ring gear 39.

A secondary drive axle 42 surrounds the crank axle 26 adjacent the strain wave gear 16, being located within the volume of the strain wave gear 16 and largely within the volume of the flex-spline 38.

The secondary drive axle 42 is a stepped cylindrical component. The crank one-way bearing 32 connects the secondary drive axle 42 to the crank axle 26 and is located within the secondary drive axle 42. An interior clutch mount section 44 is provided within the secondary drive axle 42 where the crank one-way bearing 32 attached.

A flared initial portion 45 is provided on the secondary drive axle 42 adjacent the electric motor 14. A first interior drive axle support bearing 46 is provided within this flared portion 45. A two-way ball bearing is employed in the present embodiment. A circlip 63 abuts the first interior drive axle support bearing 46 retaining it within the flared portion.

A second interior support bearing 52 is located on the other side of the crank one-way bearing 32 again within the interior of the secondary drive axle 42. The interior surface portion 50 upon which the outer race of the bearing 52 is mounted has a slightly narrower diameter than the interior clutch mount section 44.

An interior flange 51 is provided at the terminus of the interior surface portion 50. A second interior support bearing shoulder 54 commences the interior flange 51, which transitions to a fillet 56 which provides the interior surface of the interior flange 51. The second interior support bearing 52 is constrained axially against the shoulder 54. The crank one-way bearing 32 is flanked on either side (viewed axially along the crank axle 26) by the first interior drive axle support bearing 46 and the second interior support bearing 52.

An axle lip 58 extends around the circumference of the secondary axle 42 on the outermost end i.e. the end located adjacent the crank 22. The innermost edge of the bearing socket 30b is located within the axle lip 58.

A ghost axle 60 is splined around the crank axle 26 and is located within the secondary drive axle 42. The first interior drive axle support bearing 46, the crank one-way bearing 32 and the second interior support bearing 52 attach the secondary drive axle 42 to the ghost axle 60.

The ghost axle 60 provides non-splined surfaces to which the inner races of the first interior drive axle support bearing 46, the crank one-way bearing 32 and the second interior support bearing 52 may attach. The localised increase in diameter also provided at these points allows larger interior diameter bearings 46, 32, 56 to be employed.

The ghost axle 60 comprises a ghost mounting axle 62 of narrowest diameter. The mounting axle 62 has an interior spline that couples to the exterior spline of the crank axle 26.

First, second and third larger diameter external bearing surfaces 64, 66, 68 are provided on the ghost axle 60. A ghost axle support web 70 is provided around the ghost mounting axle 62 and mounts the three external bearing surfaces 64, 66, 68. An outer ghost boss 72 is the structure which provides the three external bearing surfaces 64, 66, 68 and the support web 70 mounts the outer ghost boss 72.

The ghost axle 60 overall has a mushroom-shaped external appearance. First external bearing surface 64 is located adjacent the ghost mounting axle 62 and adjacent the ghost axle support web 70 and provides the innermost or motor 14 side portion of the outer ghost boss 72. The second external bearing surface 66 is located axially adjacent the first surface 64 toward the drive cap 30 side of the apparatus 10. A ghost axle lip 74 extends radially out from the outer ghost boss 72 and marks the boundary between the first and second bearing surfaces 64, 66. The first and second bearing surfaces 64, 66 are approximately equal in external diameter.

The third bearing surface 68 is provided at the terminal portion of the ghost axle 60 located adjacent the interior flange 51 of the secondary drive axle 42. The third bearing surface 68 has a greater diameter than the ghost mounting axle 62 and a lesser diameter than the first and second bearing surfaces 64, 66. A ghost axle fillet 76 is located adjacent the second bearing surface 66. A bearing shoulder 78 is provided between the third bearing surface 68 and the fillet 76. The first interior drive axle support bearing 46, the crank one-way bearing 32 and the second interior support bearing 52 attach respectively to the first, second and third larger diameter external bearing surfaces 64, 66, 68. The second interior support bearing 52 is constrained on the ghost axle 60 side by the bearing shoulder 78 and on the secondary drive axle side 42 by the second interior support bearing shoulder 54. These mitigate axial travel of the bearing 52. A first ghost axle circlip 69 is provided on the outer edge of the second interior support bearing 52 in the first embodiment but is absent on the second embodiment (compare FIGS. 1 & 2 vs FIGS. 3 & 6).

As the rider rotates the crank system 20, it imparts rotational motion through the ghost axle 60, through the pedal one-way clutch 32 onto the secondary axle 42. The secondary drive axle 42 imparts motion to the drive cap 30 which in turn rotates the chain ring lugs 28, the chain ring 28a driving the rear wheel.

As the electric motor 14 drives the rotor 88, it imparts rotational motion through the strain wave gear 16 to the flex-spline 38 through the motor one-way clutch 34 onto the secondary axle 42, thereby driving the drive cap 30. The one-way clutches 32, 34 insulate the rotational motion from the two rotational inputs.

A strain gauge mounting portion 80 is provided on the external surface of the ghost mounting axle 62. The strain gauge mounting portion 80 is a flattened, planar surface on the otherwise cylindrical surface of the ghost mounting axle 62.

A strain gauge board mounting portion 82 is located adjacent the strain gauge mounting portion 80 and distally of the outer ghost boss 72. The strain gauge board mounting portion 82 is also a flattened planar surface on the otherwise cylindrical surface of the ghost mounting axle 62.

The strain gauge mounting portion 80 is axially shorter in length than the strain gauge board mounting portion 82. The surface of the strain gauge mounting portion 80 is a greater distance from the pedal axle 26 than the strain gauge board mounting portion 82. In other words, the strain gauge mounting portion 80 is located radially outward of the strain gauge board mounting portion 82.

A strain gauge 84 is attached onto the strain gauge mounting portion 82. In the present embodiment, a half bridge strain gauge 84 is employed. The strain gauge 84 is attached by a suitable adhesive in the present embodiment. It will be understood that alternative strain gauges and joining methods may be employed.

A torque signal processor board 86 is located partially on the strain gauge board mounting portion 82. The strain gauge 84 is the primary input and provides an analogue torque measurement signal to the torque signal processor board 86. The torque signal processor board 86 primarily converts the analogue strain gauge signal to a digital output signal.

As can be seen from the Figs, the strain gauge 84 is located between the motor 14 and the end cap 30. The strain gauge 84 is located adjacent and in the general plane of the ring gear 39 of the strain wave gear 16.

A rotor shaft 88 is provided around the crank axle 26 and comprises a cylindrical rotor section 90 which attaches to a flared wave generator section 92. Permanent magnets 94 are provided around the cylindrical rotor section 90. Rotation of the cylindrical rotor section 90 (and therefore of the rotor shaft 88) is achieved by the interaction between the electromagnetic stator coil 15 and these permanent magnets 94. In the present embodiment, four such elongate permanent magnets 94 are provided around the cylindrical rotor section 90. This number may be varied.

The flared wave generator section 92 comprises a first magnet shoulder portion 96 of larger diameter than the cylindrical rotor section 90. A bearing boss section 98 is attached to the first magnet shoulder portion 96 through a fillet portion 100. A drive side motor bearing 102 is provided around the bearing boss section 98. A stator casing 104 is provided around the exterior of the stator coil 15. A stator casing end cap 106 is located adjacent the drive side motor bearing 102. An interior bearing mount socket 108 is provided in the centre of the stator end cap 106 which provides the exterior mounting for the drive side motor bearing 102.

A flared motor side bearing mount 101 is provided on the motor side end of the rotor 88 located opposite from flared wave generator section 92. A motor side bearing 103 is attached around the flared motor side bearing mount 101. A motor side bearing mount disk 105 is provided around the bearing 103. The motor side bearing mount disk 105 fits on the motor side of the case 27.

A wave generator portion 110 is attached to the bearing boss section 98 through a wave generator mounting flange 112. The wave generator portion 110 provides the wave generator 36 of the strain wave gear 16.

A wave generator bearing 40 is mounted between the wave generator 36 (i.e. the wave generator portion 110 of the rotor shaft 88) and the flex-spline 38. The flex-spline 38 is located between the wave generator bearing 40 and the outer ring gear 39.

The flex-spline 38 is a substantially cylindrical or cup-shaped body which comprises a splined portion 38a having an exterior splined surface which meshes with the exterior ring gear 39. A cylindrical flex cup portion 38b extends from the splined portion 38a and surrounds the ghost boss 72 of the ghost axle 60 and the secondary drive axle 42. The drive cap 30 surrounds the cylindrical flex cup portion 38b. Ring gear bolts 39a affix the ring gear 39 to a ring gear retaining ring 39b which fits within the case 27. Since the ring gear 39 is fixed, the flex-spline 38 rotates under the action of the wave generator 36 rotating.

A grease port 59 is provided through the casing 27 adjacent the upper portion (from the perspective of the Figs)

of the wave generator 36, flex-spline 38 and ring gear 39 meshing point. A rubber plug seal 59a is seated within the grease port 59 but may be removed in order to lubricate the strain wave gear 16 with grease.

A rubber O-ring seal 61 is provided between the ring gear 39 and the uppermost part of the grease port 59. The O-ring seal 61 mitigates grease being forced into the motor 14 side of the drive 10.

Flex cup attachment flange 38c is provided at the terminus of the cylindrical flex cup portion 38b located distally from the splined portion 38a. Eight bolt holes 38d are provided around the flex cup attachment flange 38c.

Flex coupling axle 114 is located within the cylindrical flex cup portion 38b. Bolts 116 attach the flex coupling axle 114 to the flex-spline 38 via the eight bolt holes 38d that are provided around the flex cup attachment flange 38c.

The flex coupling axle 114 comprises a corresponding initial attachment flange 118 which has eight tapped bolt bores 120 to receive the bolts 116. A flex coupling axle centre portion 122 mounts the attachment flange 118 at a first end of the axle 114. A flared bearing mount portion 124 is located on a second end of the flex coupling axle 114.

Motor one-way bearing 34 is located within the flex coupling axle centre portion 122 with its outer race attached to the interior of the centre portion 122. The inner race of the motor one-way bearing 34 is attached to the exterior of the secondary drive axle 42. Motor one-way bearing mounting surface 126 is provided around the exterior of the secondary drive axle 42 and is located adjacent the second interior support bearing 52, the interior surface portion 50 and the interior flange 51. Two support bearings 123, 125 are provided within the flex coupling axle 114 located inboard and outboard of the motor one-way bearing 34. An outer flex axle circlip 127 is provided to abut the outboard support bearing 123 and an inner flex axle circlip 129 is provided inboard of the inboard support bearing 125.

A flex seal 128 is provided between the flex coupling axle 114 and the flex-spline 38 adjacent the splined portion 38a. This mitigates any material ingress into the interior of the flex-spline 38.

An electronics mounting axle 130 is provided around the crank axle 26 within the interior of the rotor. The electronics mounting axle 130 is a splined spindle, with both an interior and exterior spline. The interior spline receives the exterior spline of the crank axle 26. A ghost axle mounting socket 132 is provided at a first end which receives the ghost mounting axle 62. In the present embodiment, the torque signal processor board 86 is mounted partially on the exterior of the ghost axle mounting socket 132 and partially on the strain gauge board mounting portion 82. A flattened mounting portion 134 is provided on the mounting socket 132 to accommodate the planar nature of the torque signal processing board 86. The electronics mounting axle 130 and ghost axle 60 together provide a tertiary axle upon which the strain gauge 84 is situated, this tertiary axle surrounding and being splined/rotationally coupled to the primary or crank axle 26. The secondary axle 42 surrounds the tertiary axle and are coupled through the one-way clutch 32.

A flexible cable 136 is provided which runs axially along the exterior surface of the electronics mounting axle 130. One or more of the exterior splines may be omitted at this area to allow the cable to be more easily seated along the mounting axle 130. An LED driver board 138 is provided on a second end of the electronics mounting axle 130 with the flexible cable 136 connecting the torque signal processing board 86 to the LED driver board 138. A receiver coil disk 140 is located adjacent and outboard of the LED driver board 138 on the second end of the electronics mounting axle 130. The receiver coil disk 140 provides power for both the strain gauge 84 and the torque signal processing board 86. The receiver coil disk 140 has a resonance frequency of 13.56 MHz in the present embodiment, the same as that of the LED driver board 138. The LED driver board 138 has a shunt regulator for power conditioning and allowing for stable low level voltage to be applied to the torque sensor circuitry. Receiver coil disk 140 powers the LED driver board 138 by induction, which in turn supplies power along the flexible cable 136 to the strain gauge 84. A communications board 143 is mounted adjacent the receiver coil disk 140 and fixed within the motor side end cap 29.

A torque signal amplifier 86a is provided on the torque signal processing board 86 to amplify the analogue resistance signal generated by the strain gauge 84 as it measures the strain imparted on the ghost axle 60 by the rider exerting force on the crank axle 26. A torque signal processor 86b converts the amplified resistance signal into a digital signal. The electric motor 14 creates an appreciable amount of electromagnetic interference and by converting the analogue torque signal to digital it mitigates the possibility of the signal being corrupted or otherwise unduly influenced to provide a false reading.

Four infrared torque signal LEDs 142 are provided around the interior diameter of the receiver coil disk 140. These are spaced equally around the disk 140 and are provided 90° apart from each other. In alternative embodiments, the number and placement of these may be varied. A single LED may be provided for example.

Four corresponding torque infrared optical receivers 144 are provided on the communications board 143. Two torque infrared optical receivers 144 are provided on the axle side of the communications board 143 and two are provided on the opposite side of the board 143. The infrared torque signal LEDs 142 and torque infrared optical receivers 144 are arranged such that at least one LED 142 directs its emitted infrared light towards at least one optical receiver 144. One or all of the LEDs 142 may emit an infrared coded digital signal providing the measured torque value from the strain gauge 84.

The torque infrared optical receivers 144 have built in gain control and a demodulator that produce a digital torque measurement signal.

A cadence sensor assembly 146 is also provided. This measures both the speed and rotation direction of the crank axle 26. A toothed light gate disk 148 is mounted adjacent the disk 140. A plurality of teeth 150 are provided which project axially away from the disk 140 towards the LED driver board 138. Two LED cadence sensors 152 are mounted on the LED driver board 138. These are U-shaped sensors 152 which project towards the toothed light gate disk 148 and allow the teeth 150 to pass within them. A cadence infrared LED emitter and sensor are provide on the interior sides of the U-shaped sensors 152 such that an LED emitter on one leg emits light towards the communications board 143 second leg where the sensor is provided. As the teeth 150 pass through the U-shaped sensors 152 they block the light and a digital cadence signal is generated. A flat-line signal of either 0 or 1 indicated that the crank axle 26 is not rotating since the toothed light gate disk 148 is not rotating.

A square wave cadence signal is generated when the crank axle 26 is rotating. The frequency of the wave provides the information as to the speed of rotation of the axle. Providing two such cadence signals by using two separate sensors means that comparing the two signals can provide an indication as to the direction of travel as well as the speed of that travel.

In the present embodiment, the U-shaped sensors are provided 45° apart to provide the offset of the two signals. This may be varied.

A power board 160 is provided adjacent the communications board 143 and connects to the board via complimentary connectors 162, 139. The power board 160 takes power from the bicycle's battery (not shown) to power the electronics.

A signal processor 161 is provided on the power board 160. The signal processor 161 is fed the various signals (primarily the torque and cadence signal) and uses this to provide a control signal to the electric motor 14.

For example, when the torque signal and cadence signal show that torque is not being applied to the crank axle 26 and the axle is not turning, the signal processor 161 will not provide a control signal to the motor 14. However, once the cadence signal shows that the bicycle B has reached a pre-determined speed (which may be inferred from the rotation of the crank axle 26 along with potentially a signal showing what gear the bicycle B is in) a control signal may be provided to turn the motor on.

The placement of the strain gauge 84 near the approximate mid-point of the crank axle 26 allows measurement of the torque from both cranks 22, 24. If the strain gauge 84 was placed more toward pedal cranks 22 it would only be able to measure the non-drive side torque as the drive side torque would dissipate straight into the pedal clutch 32. It is worth noting that the torque applied to the drive side crank arm 24, has to go under the pedal clutch 32 and up through the ghost axle 60 to apply torque onto the secondary axle 42, allowing measurement of the torque/strain from both pedal cranks 22, 24.

A power, communications and external sensor cable harness 162 provides a conduit for a cable from the battery (not shown—but which may be located in the down-tube, seat-tube, bottle battery, etc) and may also provide wiring from external sensors such as a speedometer, rear wheel speed sensor, tilt sensors, weight sensors, etc.

Referring to FIG. 21, a third embodiment electric bicycle drive system 310 is shown. The drive system 310 is located within the bottom bracket shell 312 of a bicycle B. The drive system 310 comprises an electric motor 314, a strain wave gear 316 and a first or manual rotational input 318 (namely a pedal-crank system 320). The electric motor 314 acting through the strain wave gear 316 provides a second or electrical rotational input.

The drive system 310 is largely similar (except of course for the foregoing novel and inventive features hereinbefore described) to that described in our previous International Patent Application No PCT/GB2018/052838, the contents of which are hereby incorporated by reference. It will be understood that the embodiments described herein are compatible with and may be used to improve upon the teachings of the incorporated document to provide further embodiments of the present invention.

The pedal-crank system 320 comprises two pedal cranks 322, 324, connected by a crank axle 326.

A chain ring 328 is provided on a secondary axle 330, with both the electric motor 314 (via the strain wave gear 316) and the pedal-crank system 320 imparting rotational motion to the secondary axle 330.

A crank one-way bearing 332 and motor one-way bearing 334 are provided, respectively, between the pedal-crank system 320 and the strain wave gear 316, meaning that rotational inputs from each source are insulated from one another and the rider does not feel any motion from the electric motor 314, nor can the rider damage the motor 314 or strain wave gear 316 through the action of their pedalling.

The strain wave gear 316 of the present embodiment comprises a wave generator 336, a flex-spline 338 and a circular spline 339.

The wave generator 336 of the present embodiment has a modified shape in that rather than being a regular ellipse of prior art harmonic designs (see FIG. 22), it is a rounded rectangle as shown in FIG. 23.

The use of such a shape increases the number of teeth of the wave generator 336 which are meshed with those of the flex-spline 338. This may increase the possibility/extent of backlash, but may also increase the efficiency of the drive, by preventing the need for the wave generator 336 to be sized to cause deformation of the flex-spline 338 upon insertion, reducing the load on the bearing(s) and reducing the start-up torque required. Although little or no backlash is a feature of prior art strain wave gears, the present application does not need backlash to be completely eliminated, and therefore a degree of backlash can be accommodated, especially since the potential reduction in bearing stress and start-up torque required from the electric motor 314 may be reduced and the overall efficiency increased.

It is desirable that the motor 314 only provide rotational motion to the secondary axle 330 when the pedal cranks are rotating i.e. when the rider wishes the bicycle BB to move. A motor controller 340 is provided to enable that function. The motor controller 340 is provided on a circular circuit board 341.

A torque sensor 342 is provided to enable a measurement of the torque applied to the crank axle 326 to be measured. The torque sensor 342 comprises a resilient connector being a rubber block 344 which is seated within a key-slot 345 on the crank axle 326. A plastic tube 346 surrounds the crank axle 326 and connects to the rubber block 344. A light gate disk 348 connects to the distal end of the tube 346. The light gate disk 348 has a number of apertures (not shown) through it (which may range generally from around 20 to 120 in number, although there may be more or fewer depending on application).

In the present embodiment the disk 348 has 360 apertures (not shown), each spaced 6° apart. Two light sensors 350, 352 are provided which have an emitter and sensor on either side of the disk: as the apertures pass between the light sensors a measurement of both the presence of rotation, the speed of rotation and the applied torque may be measured.

Moreover, the degree of transparency (or inversely the "opacity") of the aperture as it passes across the sensor(s) may be measured i.e. 0% light passes when there is no aperture between the sensor and emitter but as each aperture passes through this junction the amount of light rises from 0% to 100% and back to 0%. As the crank axle 326 rotates, the rubber block 344 has a shearing force exerted onto it, which causes it to harden and rotates the plastic tube 346 and the light gate disk 348. The motor controller 340 can switch on the motor 314 when (a) predetermined rotational condition(s) is/are met.

The light sensors 350, 352 are provided adjacent opposite sides of the disk 348. The light sensors comprise both an emitter and a receptor located on opposite sides of the disk 348.

One light sensor array is configured to provide a measurement of the speed of rotation of the disk 348 by measurement of the apertures rotating by sensing the increase in light; the number of apertures and their circumferential difference being known constants.

One light sensor may be configured to measure the relative transparency or opacity of the section of disk within its sensing area. For example, if 50% of the area of the aperture is within the sensing area, around 50% of the light may be measurable and the motor controller may infer/calculate that condition accordingly.

Two support bearings 354, 356 are provided to flank and abut the first rotational input one-way bearing 332 to prevent axial travel of the first rotational input one-way bearing 332. These are not necessarily thrust bearings, but provide that function.

One or more circlips may be provided to axially locate the first rotational input one-way bearing 332.

Two more support bearings 360, 362 are provided to flank and abut the second rotational input one-way bearing 334 to prevent axial travel of the second rotational input one-way bearing 334.

One or more circlips may be provided to axially locate the second rotational input one-way bearing.

The flex-spline 338 defines a locus of space and within that locus both the one-way bearings 332, 334 are located. This allows for a compact design and a minimising of the Q factor (i.e. the distance between the cranks 322, 324).

A case or casing 364 is provided in which the various components are mounted. The case 364 may be slid into place and attachable within the bottom bracket shell 312 of bicycle BB. The case 364 is a sealed unit and allows for easier installation and maintenance of the drive system 310. Being sealed, the various components of the drive system 310 are protected from environmental contaminants.

The motor controller board 341 is generally disk-shaped with a central axle aperture 343. The plane of the disk of the motor controller board 341 is orientated generally perpendicular to a central rotational axis X-X of the drive system 310 and the crank axle 326.

The motor controller board 341 is mounted on a controller board boss 366. The controller board boss is adjacent one of the pedal cranks, namely offside pedal crank 324. The boss 366 is formed around a pedal crank bearing housing 368, within which is a pedal crank bearing 370.

As can be seen from the Figs, the components of the drive system 310 are axially located between the pedal cranks 322, 324. They are generally ordered (from left to right of FIG. 21): (1) offside pedal crank 324 (2) motor control board 341 (3) electrical motor 314 (4) strain wave gear 316 (5) rotational output (secondary axle 330 and chain ring 328 assembly) (6) nearside pedal crank 322.

FIG. 24 is a fourth embodiment of the present invention, showing a drive system generally referred to as 400. Integers analogous to the third embodiment as above albeit with a prefix "4" (electric motor becomes 414 and so forth).

The main difference in the second embodiment is the omission of the torque sensor and motor controller board which may be located outside the drive system 400.

Modifications and improvements may be made to the described embodiments without departing from the scope of the present invention.

For example, the torque measuring system 442 may be replaced with a magnetic flux device, surrounding the drive axle 426. Alternatively, strain gauges may be positioned on one or more of the cranks and/or case to measure mechanical force being applied to the drive 10, 100 as the rider pedals. The strain gauges may be hardwired back to the motor controller board or may use radio or near field communication to communicate with the motor controller.

It will be understood that features of the individually described embodiments may be combined with one another to form further embodiments within the scope of the present invention.

The invention claimed is:

1. A vehicle drive system, comprising;

a first rotational input;

a second rotational input; and a rotational output, wherein the first rotational input is transmitted through a strain wave gear to a first rotational input one-way bearing, and wherein the second rotational input is transmitted through a second rotational input one-way bearing to the rotational output, the first and second one-way bearings being affixed to a secondary axle, the secondary axle driving the rotational output, wherein the second rotational input is provided by a primary axle, the primary and secondary axles being coaxial, the secondary axle surrounding the primary axle, and wherein a strain gauge is provided to measure the torque applied to the primary axle, wherein the strain gauge is coupled to an analog to digital converter and wherein the analog to digital converter supplies a digital signal to one or more LED emitters.

2. The drive system of claim 1, wherein the digital signal supplied by the strain gauge provides an input to a control signal for the first rotational input.

3. The drive system of claim 1, wherein the strain gauge is mounted on or around the primary axle.

4. The drive system of claim 1, wherein there is a tertiary axle surrounding and rotationally coupled to the primary axle and the strain gauge is mounted upon the tertiary axle.

5. The drive system of claim 1, further including one or more LED sensors co-operable with the one or more LED emitters.

6. The drive system of claim 1, further including a cadence sensor for the second rotational input.

7. The drive system of claim 6, wherein the cadence sensor comprises a toothed light gate disk rotationally coupled to the primary axle with one or more LED sensors and emitters being provided co-operable with the toothed light gate disk.

8. The drive system of claim 7, wherein there are two pairs of U-shaped LED sensors and emitters and wherein the toothed light gate disk is situated at least partially within the U-shaped LED sensors and emitters.

9. The drive system of claim 1, wherein the first rotational input is an electric motor and the second rotational input is a pedal crank system.

10. The drive system of claim 1, wherein the first and second one-way bearings on the secondary axle are both flanked on either side by support bearings.

11. The drive system of claim 10, wherein one or more circlips are provided to abut one or more of the support bearings.

12. A bicycle including at least one drive system according to claim 1.

\* \* \* \* \*